US009892630B1

(12) United States Patent
Strods

(10) Patent No.: US 9,892,630 B1
(45) Date of Patent: Feb. 13, 2018

(54) NETWORK LIGHT SWITCH WITH MECHANICAL/ELECTRICAL INTERFACE PORT

(71) Applicant: Belkin International, Inc., Playa Vista, CA (US)

(72) Inventor: Raymond Strods, Playa Vista, CA (US)

(73) Assignee: BELKIN INTERNATIONAL INC., Playa Vista, CA (US)

( * ) Notice: Subject to any disclaimer, the term of this patent is extended or adjusted under 35 U.S.C. 154(b) by 0 days.

(21) Appl. No.: 15/411,537

(22) Filed: Jan. 20, 2017

(51) Int. Cl.
*G08C 17/02* (2006.01)
*H04W 4/00* (2018.01)

(52) U.S. Cl.
CPC ............ *G08C 17/02* (2013.01); *H04W 4/005* (2013.01); *G08C 2201/30* (2013.01); *G08C 2201/92* (2013.01); *H04W 4/008* (2013.01)

(58) Field of Classification Search
CPC .......................... G08C 17/02; G08C 2201/30; G08C 2201/92; H04W 4/005; H04W 4/008
USPC .............................................. 340/12.5–12.55
See application file for complete search history.

(56) References Cited

U.S. PATENT DOCUMENTS

| 2003/0194912 | A1* | 10/2003 | Ferentz | H01R 13/6658 439/676 |
| 2007/0015416 | A1* | 1/2007 | Gutierrez | H01R 24/64 439/676 |
| 2008/0248684 | A1* | 10/2008 | Filipon | H01R 13/6658 439/485 |

* cited by examiner

*Primary Examiner* — Allen T Cao
(74) *Attorney, Agent, or Firm* — Kilpatrick Townsend & Stockton LLP

(57) ABSTRACT

A network device for controlling an electric light or other remote electrical device. In addition to features found in standard light switches, such as cover plates, housings, switching elements, and internal wiring, the network device may include a cover plate with embedded cover circuitry for performing advanced functions unavailable to standard light switches. Functions performed by the cover circuitry include advanced electrical communication, data processing, user interfacing, sensing, displaying, rule creation, and the like. The cover circuitry may receive electric power via a set of contact elements located on the wall-facing side of the cover plate that electrically couple with a similar set of contact elements located on the room-facing side of the housing. The coupling of contact elements may form a set of buses that enable data communication between the cover circuitry and circuitry within the housing.

20 Claims, 27 Drawing Sheets

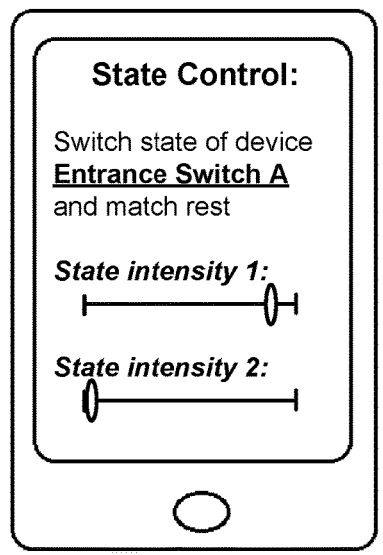 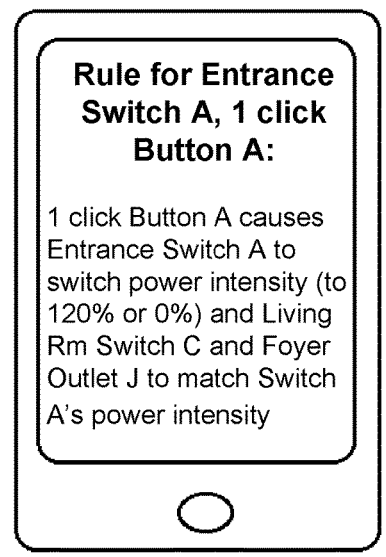
FIG. 12E          FIG. 12F

NETWORK LIGHT SWITCH WITH MECHANICAL/ELECTRICAL INTERFACE PORT

BACKGROUND

Traditionally, installing a light switch included connecting a switch with wiring in a building. If a person wanted a light switch to be placed at a new location, it was conceivable that existing wiring in a building could prevent such positioning. Even if such positioning was technically feasible, it would frequently involve cutting through walls, running cable, and appropriately connecting wires. Such tasks can be messy, intimidating and even dangerous for inexperienced people.

BRIEF SUMMARY

In a first embodiment of the present disclosure, a network device is provided. The network device may include a housing configured to be mounted into a wall. The housing may include a room-facing side and a wall-facing side. The housing may include electrical connections for coupling with a line power. The housing may include a set of housing electrical contact elements located on the room-facing side of the housing. The network device may include a cover including a room-facing surface and a wall-facing surface. The wall-facing surface of the cover may be configured to be removably attached to the room-facing side of the housing. The cover may include a set of cover electrical contact elements located on the wall-facing surface of the cover. The cover may include cover circuitry configured to receive an input signal. The cover may be attachable to the housing. The cover circuitry may be electrically coupled with the set of cover electrical contact elements. The set of housing electrical contact elements may be electrically coupleable with the set of cover electrical contact elements. The one or more elements on the room-facing side of the housing may be physically accessible through an opening defined by the cover.

In some embodiments, the cover circuitry may be electrically coupled with the line power via the set of housing electrical contact elements and the set of cover electrical contact elements. In some embodiments, the network device includes an antenna located within the cover circuitry for communicating with an electrical device. In some embodiments, the network device includes a processor located within the cover circuitry. The processor may be configured to perform operations including receiving the input signal and transmitting a signal to modify a state of an electrical device. In some embodiments, the set of housing electrical contact elements may be in physical contact with the set of cover electrical contact elements and form a USB connection. In some embodiments, the set of housing electrical contact elements may be in physical contact with the set of cover electrical contact elements and form a set of buses. The set of buses may include a first bus, a second bus, and a third bus. In some embodiments, the processor may be further configured to perform operations including using the first bus exclusively for receiving data from housing circuitry. The housing circuitry may be located within the housing. The processor may be further configured to perform operations including using the second bus exclusively for transmitting data to the housing circuitry. The processor may be further configured to perform operations including using the third bus exclusively for electrically coupling with the line power. In some embodiments, the cover circuitry may include a sensor located on the room-facing surface of the cover. The sensor may be configured to output a sensor reading related to controlling a state of an electrical device. In some embodiments, the sensor includes a temperature sensor.

In some embodiments, a computer-implemented method is provided. The method may include receiving, by cover circuitry located within a cover, an input signal for controlling a state of an electrical device. A wall-facing surface of the cover may be configured to be removably attached to a room-facing side of a housing. The housing may be configured to be mounted into a wall. The method may include transmitting, by the cover circuitry, a signal to modify the state of the electrical device. The cover may be attachable to the housing. A set of housing electrical contact elements located on the room-facing side of the housing may be electrically coupleable with a set of cover electrical contact elements located on the wall-facing surface of the cover. The cover circuitry may be electrically coupled with the set of cover electrical contact elements. One or more elements on the room-facing side of the housing may be physically accessible through an opening defined by the cover.

In some embodiments, the method may include receiving, by the cover circuitry, electric power from a line power. The electric power may be received by the cover circuitry from the line power via the set of housing electrical contact elements and the set of cover electrical contact elements. In some embodiments, the cover circuitry may include an antenna for communicating with the electrical device. In some embodiments, the set of housing electrical contact elements may be in physical contact with the set of cover electrical contact elements and form a USB connection. In some embodiments, the set of housing electrical contact elements may be in physical contact with the set of cover electrical contact elements and may form a set of buses. The set of buses may include a first bus, a second bus, and a third bus. The method may include using, by a processor located within the cover circuitry, the first bus exclusively for receiving data from housing circuitry. The housing circuitry may be located within the housing. The method may include using, by the processor, the second bus exclusively for transmitting data to the housing circuitry. The method may include using, by the processor, the third bus exclusively for electrically coupling with the line power. In some embodiments, the cover circuitry may include a sensor located on a room-facing surface of the cover. The sensor may be configured to output a sensor reading related to controlling the state of the electrical device. In some embodiments, the sensor includes a temperature sensor. In some embodiments, a non-transitory computer-readable medium may be provided that includes instructions that, when executed by a processor, cause the processor to perform the computer-implemented method.

In a second embodiment of the present disclosure, a network device is provided. The network device may include a housing configured to be mounted into a wall. The housing may include a room-facing side and a wall-facing side. The housing may include electrical connections for coupling with a line power. The network device may include a cover including a room-facing surface and a wall-facing surface. The wall-facing surface of the cover may be configured to be removably attached to the room-facing side of the housing. The network device may include an electronic display located on the room-facing surface of the cover. The network device may include a processor electrically coupled with the electronic display. The processor may be configured to perform operations including outputting a representation of an electronic device on the electronic display. The electronic device may be associated with a state. The processor may be configured to perform operations including receiving input corresponding to a selection of the electronic device. The processor may be configured to perform operations including receiving input corresponding to a modification of the state of the electronic device. The processor may be configured to perform operations including transmitting a signal corresponding to an instruction to modify the state of the electronic device. Receiving the instruction at the electronic device may cause the electronic device to modify the state according to the instruction.

In some embodiments, the instruction may cause the electronic device to modify a power state of the electronic device. In some embodiments, the instruction may cause the electronic device to modify a physical position state of the electronic device. In some embodiments, the processor may be further configured to perform operations including transmitting an interrogation signal to determine a current state of the electronic device. The processor may be further configured to perform operations including receiving a response signal indicating the current state of the electronic device. The processor may be further configured to perform operations including outputting the current state of the electronic device on the electronic display. In some embodiments, the processor may be further configured to perform operations including transmitting an interrogation signal to determine a current power state of the electronic device. The processor may be further configured to perform operations including receiving a response signal indicating the current power state of the electronic device. The processor may be further configured to perform operations including transmitting an instruction signal to toggle the current power state of the electronic device. In some embodiments, the electronic display may include input elements. The input corresponding to the selection of the electronic device may be received by the input elements. In some embodiments, the network device may include a primary switching element located on the room-facing side of the housing. The input corresponding to the modification of the state of the electronic device may be received at the primary switching element. In some embodiments, the input corresponding to the modification of the state of the electronic device may be received by the input elements. In some embodiments, the input corresponding to the selection of the electronic device and the input corresponding to the modification of the state of the electronic device may be received simultaneously. In some embodiments, the cover includes the processor. In some embodiments, the processor is electrically coupled with the line power via the housing.

In some embodiments, a computer-implemented method is provided. The method may include outputting, by a network device including a processor, a representation of an electronic device on an electronic display. The electronic device may be associated with a state. The network device may include a housing configured to be mounted into a wall. The housing may include a room-facing side and a wall-facing side. The housing may include electrical connections for coupling with a line power. The network device may include a cover including a room-facing surface and a wall-facing surface. The wall-facing surface of the cover may be configured to be removably attached to the room-facing side of the housing. The cover may include cover circuitry including the electronic display located on the room-facing surface of the cover. The method may include receiving input corresponding to a selection of the electronic device. The method may include receiving input corresponding to a modification of the state of the electronic device. The method may include transmitting, using the network device, a signal corresponding to an instruction to modify the state of the electronic device. Receiving the instruction at the electronic device may cause the electronic device to modify the state according to the instruction.

In some embodiments, the instruction may cause the electronic device to modify a power state of the electronic device. In some embodiments, the method may include transmitting an interrogation signal to determine a current state of the electronic device. The method may include receiving a response signal indicating the current state of the electronic device. The method may include outputting the current state of the electronic device on the electronic display. In some embodiments, the method may include transmitting an interrogation signal to determine a current power state of the electronic device. The method may include receiving a response signal indicating the current power state of the electronic device. The method may include transmitting an instruction signal to toggle the current power state of the electronic device such that a device that was previously powered off is powered on and a device that was previously powered on is powered off. In some embodiments, the electronic display may include input elements. The input corresponding to the selection of the electronic device may be received by the input elements. In some embodiments, a primary switching element may be located on the room-facing side of the housing. The input corresponding to the modification of the state of the electronic device may be received by the primary switching element. In some embodiments, the input corresponding to the modification of the state of the electronic device may be received by the input elements. In some embodiments, the input corresponding to the selection of the electronic device and the input corresponding to the modification of the state of the electronic device may be received simultaneously. In some embodiments, a non-transitory computer-readable medium may be provided that includes instructions that, when executed by a processor, cause the processor to perform the computer-implemented method.

In a third embodiment of the present disclosure, a network device is provided. The network device may include a housing configured to be mounted into a wall. The housing may include a room-facing side and a wall-facing side. The housing may include electrical connections for coupling with a line power. The network device may include a cover including a room-facing surface and a wall-facing surface. The wall-facing surface of the cover may be configured to be removably attached to the room-facing side of the housing. The cover may include cover circuitry. The network device may include a sensor configured to provide a sensor reading. The network device may include a processor electrically coupled with the sensor. The processor may be configured to perform operations including receiving the sensor reading. The processor may be configured to perform operations including evaluating a rule. The rule may use the sensor reading. The processor may be configured to perform operations including determining that an instruction signal is to be transmitted to an electrical device. The processor may be configured to perform operations including transmitting the instruction signal to modify a state of the electrical device. The processor may be configured to perform operations including receiving the instruction at the electronic device causes the electronic device to modify the state according to the instruction.

In some embodiments, the instruction signal may include instructions to modify a power state of the electrical device.

In some embodiments, the sensor may be a temperature sensor, a light sensor, a humidity sensor, a proximity sensor, and any combination of these. In some embodiments, the rule includes a comparison of the sensor reading to a reference value. The determination that an instruction signal is to be transmitted to the remote electrical device may be made when the sensor reading either exceeds or does not exceed the reference value. In some embodiments, the network device may include a primary switching element located on the room-facing side of the housing. In some embodiments, the operations may include determining that the primary switching element has been pressed. The operations may include upon determining that the primary switching element has been pressed, transmitting a request signal to the sensor to request the sensor reading. In some embodiments, the operations may include automatically obtaining the sensor reading. The operations may include determining that the primary switching element has been pressed.

In some embodiments, a computer-implemented method is provided. The method may include receiving, by a network device including a processor, a sensor reading. The network device may include a housing configured to be mounted into a wall. The housing may include a room-facing side and a wall-facing side. The housing may include electrical connections for coupling with a line power. The network device may include a cover including a room-facing surface and a wall-facing surface. The wall-facing surface of the cover may be configured to be removably attached to the room-facing side of the housing. The cover may include cover circuitry including a sensor configured to provide the sensor reading. The method may include evaluating a rule. The rule may use the sensor reading. The method may include determining that an instruction signal is to be transmitted to an electrical device. The method may include transmitting the instruction signal to modify a state of the electrical device. Receiving the instruction at the electronic device may cause the electronic device to modify the state according to the instruction.

In some embodiments, the instruction signal may include instructions to modify a power state of the electrical device. In some embodiments may be sensor is a temperature sensor, a light sensor, a humidity sensor, or a proximity sensor. In some embodiments, the rule may include a comparison of the sensor reading to a reference value. The determination that an instruction signal is to be transmitted to the remote electrical device may be made when the sensor reading either exceeds or does not exceed the reference value. In some embodiments, the rule may be modifiable using a touch screen located on the room-facing surface of the cover. In some embodiments, a primary switching element may be located on the room-facing side of the housing. In some embodiments, the method may include determining that the primary switching element has been pressed. In some embodiments, the method may include upon determining that the primary switching element has been pressed, transmitting a request signal to the sensor to request the sensor reading. In some embodiments, the method may include automatically obtaining the sensor reading. In some embodiments, the method may include determining that the primary switching element has been pressed. In some embodiments, a non-transitory computer-readable medium may be provided that includes instructions that, when executed by a processor, cause the processor to perform the computer-implemented method.

BRIEF DESCRIPTION OF THE DRAWINGS

Illustrative embodiments are described in detail below with reference to the following drawing figures:

FIG. 12A, FIG. 12B, FIG. 12C, FIG. 12D, FIG. 12E, and FIG. 12F illustrate a series of example interfaces at a device (e.g., an access device) for receiving user input to define a rule, in accordance with an embodiment.

DETAILED DESCRIPTION

Figure 1:
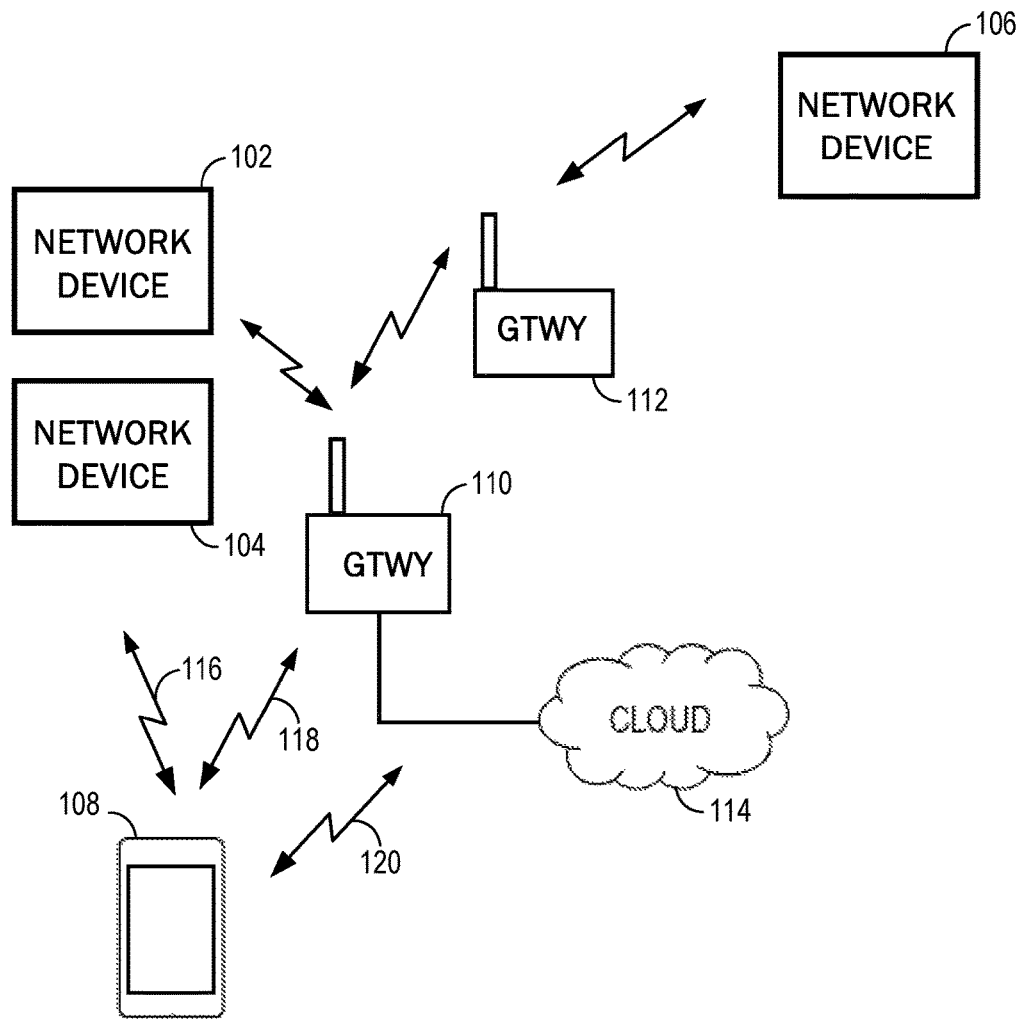
FIG. 1 is an illustration of an example of a network environment, in accordance with some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control the network devices themselves or one or more electronic devices (e.g., appliances) connected to the network devices. The electronic devices may be located within an environment or a venue that can support the network. An environment can include, for example, a home, an office, a business, an automobile, a park, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of the user's home and may include network devices located outside of the user's home. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like). In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

In some embodiments, a home local area network may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed on and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway (e.g., a network user name and password, a network security key, or any other appropriate login information). The access device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server of a wide area network, such as a cloud network server. In some embodiments, the network device may also send to the server information relating to the network device (e.g., MAC address, serial number, or the like) and/or information relating to the access device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. In some embodiments, the server may transmit the network ID and the access device's security key directly to the access device. The network device and the access device may then communicate with the cloud server using the network ID and the unique key generated for each device. Accordingly, the access device may perform accountless authentication to allow the user to remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the access device for use in accessing the first network device on the first logical network. The server may register the second gateway as the second logical network due to differences in the credentials between the first gateway and second gateway. The server may assign the second gateway a second network ID and may generate a second set of security keys. For example, the server may generate a unique security key for the second network device and may generate a unique security key for the access device for use in accessing the second network device on the second logical network. The server may associate the first network device and the access device with the first logical network by storing the first network ID and the first set of security keys in a first record or profile. The server may also associate the second network device and the access device with the second logical network by storing the second network ID and the second set of security keys in a record or profile. The server may then transmit the first network ID and the first set of security keys to the first network device, and may transmit the second network ID and the second set of security keys to the second network device. The two network devices may store the respective network ID and set of security keys of the gateway with which each network device is connected. Each network device may send the respective network ID and the access device's unique security key to the access device. The network devices and the access device may then communicate with the cloud server using the respective network ID and the unique key generated for each device.

Accordingly, when multiple gateways are included in the home local area network, multiple logical networks associated with different network identifiers may be generated for the local area network. When the access device is located within range of both gateways in the local area network, there is no problem accessing both network devices due to the ability of the access device to perform local discovery techniques (e.g., universal plug and play (UPnP)). However, when the user is located remotely from the local area network, the access device may only be associated with one logical network at a time, which prevents the access device from accessing network devices of other logical networks within the local area network.

The present disclosure describes a network device for controlling an electric light or other remote electrical device. The network device may include many of the features found in standard light switches, such as a cover plate, a housing, a switching element, and internal wiring. In addition to these features, the network device may include a cover plate with embedded cover circuitry for performing advanced functions unavailable to standard light switches, such as advanced electrical communication, data processing, data storing, sensing, displaying, customization, user interfacing, rule creation, rule implementation, and the like. The cover circuitry may receive electric power via a set of contact elements located on the wall-facing side of the cover plate that electrically couple with a similar set of contact elements located on the room-facing side of the housing. The coupling of contact elements may form a set of buses that enable data communication between the cover circuitry and circuitry within the housing.

FIG. 1 illustrates an example of a local area network 100. The local area network 100 includes network device 102, network device 104, and network device 106. In some embodiments, any of the network devices 102, 104, 106 may include an Internet of Things (IoT) device. As used herein, an IoT device is a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, an infrared (IR) transceiver, and/or any other wireless network transceiver radio or interface that allows the IoT device to communicate with a wide area network and with one or more other devices. In some embodiments, an IoT device does not include a cellular network transceiver radio or interface, and thus may not be configured to directly communicate with a cellular network. In some embodiments, an IoT device may include a cellular transceiver radio, and may be configured to communicate with a cellular network using the cellular network transceiver radio. The network devices 102, 104, 106, as IoT devices or other devices, may include home automation network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In some embodiments, network devices 102, 104, 106 may be used in other environments, such as a business, a school, an establishment, a park, or any place that can support the local area network 100 to enable communication with network devices 102, 104, 106. For example, a network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

A user may communicate with the network devices 102, 104, 106 using an access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device e.g., a television, a refrigerator, a security system, a game console, a browser, or the like), a speech or gesture interface (e.g., a Kinect™ sensor, a Wiimote™, or the like), an IoT device interface (e.g., an Internet enabled device such as a wall switch, a control interface, or other suitable interface), or the like. In some embodiments, the access device 108 may include a cellular or other broadband network transceiver radio or interface, and may be configured to communicate with a cellular or other broadband network using the cellular or broadband network transceiver radio. In some embodiments, the access device 108 may not include a cellular network transceiver radio or interface. While only a single access device 108 is shown in FIG. 1, one of ordinary skill in the art will appreciate that multiple access devices may communicate with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). For example, the access device 108 may communicate directly with network device 102, 104, 106 using Zigbee™ signals, Bluetooth™ signals, WiFi™ signals, infrared (IR) signals, UWB signals, WiFi-Direct signals, BLE signals, sound frequency signals, or the like. In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., Zigbee™, Bluetooth™, WiFi™, IR, UWB, WiFi-Direct, BLE, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can provide communication capabilities to network devices 102, 104, 106 and/or access device 108 via radio signals in order to provide communication, location, and/or other services to the devices. The gateway 110 is directly connected to the external network 114 and may provide other gateways and devices in the local area network with access to the external network 114. The gateway 110 may be designated as a primary gateway. While two gateways 110 and 112 are shown in FIG. 1, one of ordinary skill in the art will appreciate that any number of gateways may be present within the local area network 100.

The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WiFi™ (e.g., IEEE 802.11 family standards, or other wireless communication technologies, or any combination thereof). Using the communications protocol(s), the gateways 110, 112 may provide radio frequencies on which wireless enabled devices in the local area network 100 can communicate. A gateway may also be referred to as a base station, an access point, Node B, Evolved Node B (eNodeB), access point base station, a Femtocell, home base station, home Node B, home eNodeB, or the like.

The gateways 110, 112 may include a router, a modem, a range extending device, and/or any other device that provides network access among one or more computing devices and/or external networks. For example, gateway 110 may include a router or access point, and gateway 112 may include a range extending device. Examples of range extending devices may include a wireless range extender, a wireless repeater, or the like.

A router gateway may include access point and router functionality, and may further include an Ethernet switch and/or a modem. For example, a router gateway may receive and forward data packets among different networks. When a data packet is received, the router gateway may read identification information (e.g., a media access control (MAC) address) in the packet to determine the intended destination for the packet. The router gateway may then access information in a routing table or routing policy, and may direct the packet to the next network or device in the transmission path of the packet. The data packet may be forwarded from one gateway to another through the computer networks until the packet is received at the intended destination.

A range extending gateway may be used to improve signal range and strength within a local area network. The range extending gateway may receive an existing signal from a router gateway or other gateway and may rebroadcast the signal to create an additional logical network. For example, a range extending gateway may extend the network coverage of the router gateway when two or more devices on the local area network need to be connected with one another, but the distance between one of the devices and the router gateway is too far for a connection to be established using the resources from the router gateway. As a result, devices outside of the coverage area of the router gateway may be able to connect through the repeated network provided by the range extending gateway. The router gateway and range extending gateway may exchange information about destination addresses using a dynamic routing protocol.

The gateways 110 and 112 may also provide the access device 108 and the network devices 102, 104, 106 with access to one or more external networks, such as the cloud network 114, the Internet, and/or other wide area networks. In some embodiments, the network devices 102, 104, 106 may connect directly to the cloud network 114, for example, using broadband network access such as a cellular network. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106 and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Figure 2:
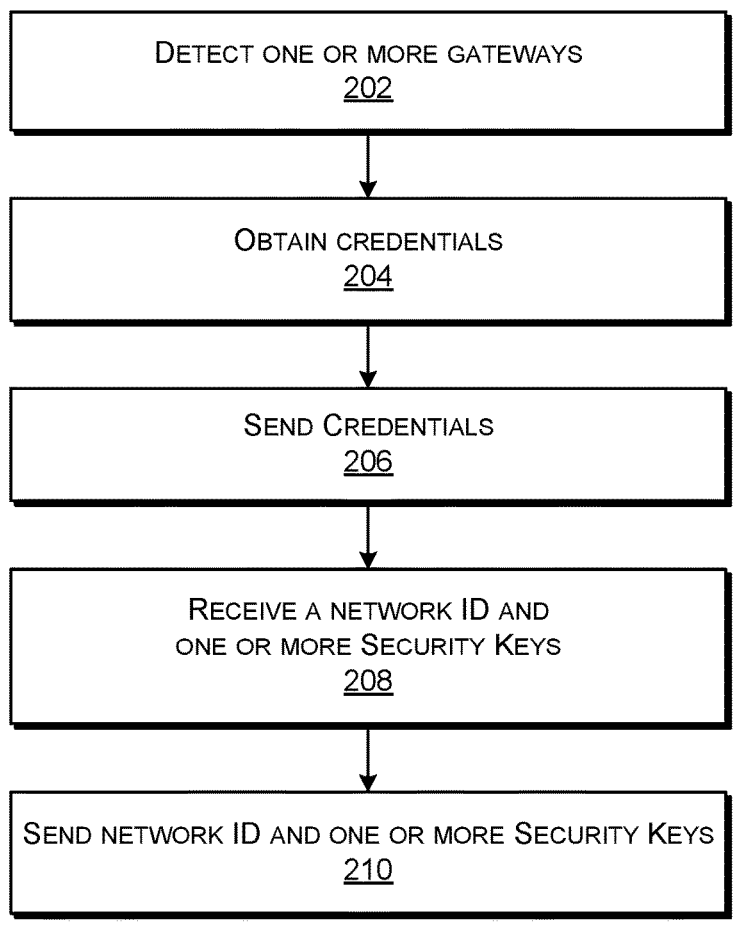
FIG. 2 is a flowchart illustrating an embodiment of a process for registering one or more network devices, in accordance with some embodiments.

Upon being powered on or reset, the network devices 102, 104, 106 may be registered with the cloud network 114 and associated with a logical network within the local area network 100. FIG. 2 illustrates an example of a process 200 for registering one or more network devices, such as the network devices 102, 104, 106 illustrated in FIG. 1. When multiple network devices 102, 104, 106 and gateways 110, 112 are included within a local area network, the network devices and/or gateways may be installed at different times, resulting in the techniques described with respect to FIG. 2 possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 202, a network device may detect one or more gateways upon being powered on or reset. In some embodiments, a provisioning process may occur when the network device is powered on or reset and detected by an access device (e.g., access device 108). During the provisioning process, the access device may directly communicate with the network device. In some embodiments, direct communication between network devices (e.g., network devices 102, 104, 106) and access device (e.g., access device 108)

may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the selected gateway. For example, the login information may be the same information that was originally set up to access the gateway network signals (e.g., when the gateway was initially installed). Once entered, the access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway. At 204, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 206. For example, the network devices 102, 104, 106 may send credentials for the gateway with which each is paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, make, model number, firmware version, and/or an interface module identifier, or the like) to the server, and/or information relating to the access device (e.g., MAC address, serial number, application unique identifier, or the like) to the server. In some embodiments, the communication of the credentials, the network device information, and/or the access device information sent from the network device to the cloud network server may be in a Hypertext Transfer Protocol (HTTP) format, a Hypertext Transfer Protocol Secure (HTTPS) format, a secure Transmission Control Protocol (TCP) format, or the like. One of ordinary skill in the art will appreciate that other communication formats may be used to communicate between the network device and the cloud network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random or pseudo-random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

At 208, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

At 210, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may process the signature in order to authenticate each device, as described below. The network device and access device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"fin"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. One of ordinary skill in the art will appreciate that other communication mechanisms may be used to communicate between the access device 108 and the cloud network 114.

The network 100 may enable a user to monitor and/or control operation of the devices 102 and 104. For example, a user may monitor and/or control operation of devices by interacting with a visual interface of the gateway 110 (i.e., a web page for gateway 110) and/or a visual interface rendered on a display of an access device, such as access device 108. In some embodiments, an application may be run on the access device. The application may cause the access device to present a graphical interface that includes a visual interface for each device accessible on the network 100.

A network device may generate and/or provide a "status" of the network device. In certain embodiments, the status or state of a network device can be indicated on a visual interface on the access device, for example within the tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the network device itself (e.g., on or off) or how the network device is situated within the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a device connected to the network device. The setting or the attribute can be adjustable within a range of values. For example, the device connected to the network device can be a light bulb and the status can include a value corresponding to brightness (e.g., a percentage of total brightness) emitted by the light bulb when the light bulb is powered-on. In another example, the device can be a motion sensor and the status can include a value corresponding to sensitivity of the sensor in a range of values between 0 to 100 when the sensor is powered on. In yet another example, the device can be a fan and the status can include a value corresponding to a speed of the fan on a scale of 0 to 100 when the fan is powered-on.

As described above, upon being powered on or reset, the network devices 102 and/or 104 may be registered with the cloud network 114 and associated with a logical network within the local area network 100. Similarly, upon being powered or switched off or otherwise being disconnected from the network 100, the status of the network device 102 would be known and stored by a cache (not shown) associated with the network 100. For example, cloud network 114 may include storage (e.g. cache) that stores the status of the network devices within each local area network 100 it is connected to and/or provides access to. In another example, the gateway 110 may include storage that stores the status of the network devices within each local area network it is connected to and/or provides access to. More specifically, the status stored in the cache may include a status table which indicates the current status of each network device (as of its last communication with each network device). A status table may include all statuses of each network device, or individual storage tables for each local area network or other subset of its network devices/networks. In one embodiment, a change in status may prompt the—network device to push its change in status to the cloud network 114 for storage or updating of the cloud's stored status table. In another embodiment, cloud network 114 and/or gateway 110 may continuously (or periodically) communicate with each network device to check to see if its status has changed.

In some embodiments, a network device (e.g. network device 102 and/or 104) may, upon connecting to the local area network 100, check the status of the network devices on the network 100. In other embodiments, one-network device may check the status of one or more of the other network devices on the network 100. The network device may seek to check the status of another network device or access device for various reasons, including to display such status(es) to a user on a display or otherwise, to check whether that network device belongs to the same network, to synchronize or coordinate any scheduled executions, to update an attribute based on adjustment received among others. For example, a network device or user may desire to check various statuses on a connected device, such as power level, timestamped activity history (e.g. temperature for a thermostat, motion for a motion detector, etc.), how long it has been active/turned on, attributes for operation of the connected device (e.g., a brightness of a lamp, a speed of a fan, or a sensitivity of a sensor, etc.), among many others.

In some embodiments, a device, such as the access device 108 shown in FIG. 1 or the gateway 110, connected to the network 100 can communicate an updated status of a network device, such as the network devices 102 and/or 104. The updated status can be communicated via the network 100 and can include an adjustment that affects a status of the network device. The adjustment can include an amount of change to one or more attributes, one or more settings, or a combination thereof related to operation of the network device connected to the network 100. The access device 108 or the gateway 110 can present a graphical interface that can receive input corresponding to an adjustment to a status of a device. In some embodiments, the updated status of the network device communicated to the network 100 can be received by a network device to which the updated status applies, or can be received by the gateway 110, the cloud network 110, or any other device in communication with the network. If the device cannot directly receive the updated status, it can also receive the updated status from the cloud network 114, the gateway 110, or the other devices in the network 100. In some embodiments, the network device can communicate its updated status to the network 100, which can indicate whether the status has been updated. The updated status can be received by the access device or any other device in the network 100. In some embodiments where the access device is not located within the network 100, the access device may not immediately receive the updated status. The updated status can be stored by the cloud network 114 or the gateway 110 for communication to the access device. The status of the network device can indicate whether an adjustment was made based on an adjustment in a setting or an attribute transmitted by the access device. Alternatively, or additionally, the access device can receive, from any other network device connected to the network 100, a status update indicating whether the adjustment was in fact made at a network device.

A network device seeking to check the status of any other device on the network 100 may communicate with the cloud network 114, to which all devices on the network 100 are connected either directly or indirectly. Since the cloud network 114 and/or the gateway 110 can store an updated table/list of the statuses of each of the network devices 102 and 104 within the requesting network's local area network, the cloud network 114 and/or gateway 110 may communicate such status data to the network devices 102 and 104 and the access device. For example, if-network devices 102 and 104 were to each turn on and communicate their statuses to cloud network 114, cloud network 114 may analyze the status of network devices 102 and 104 and communicate to network devices 102 and 104 that they are each connected to the same local area network 100.

Figure 3:
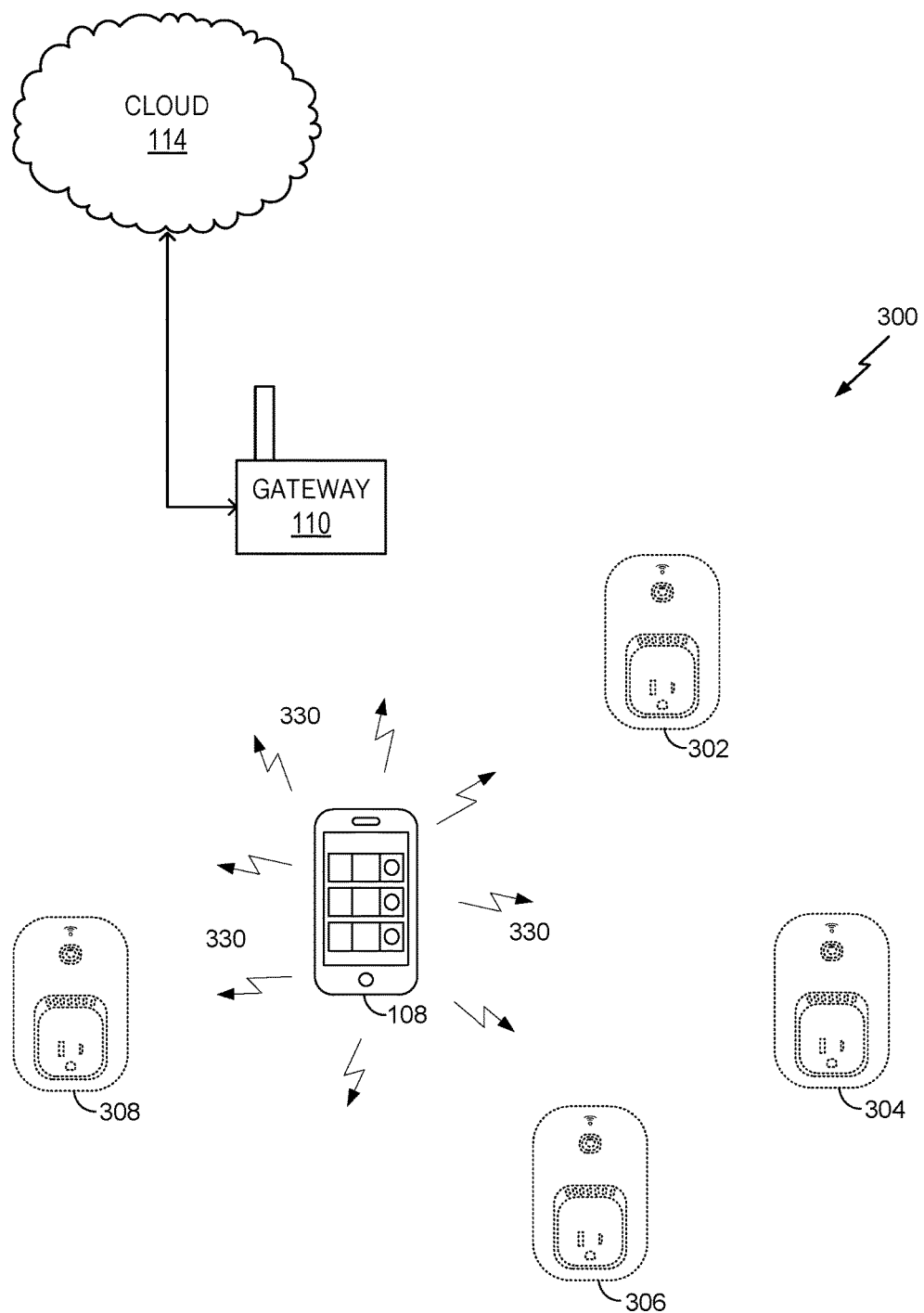
FIG. 3 is an illustration of an example of a network environment, in accordance with an embodiment.

FIG. 3 illustrates an example of a network 300, according to embodiments of the present invention. Specifically, the network 300 can be a wireless local area network enabling an access device to communicate with network devices to control adjustment of attributes related to operation of the network devices. Network 300 includes network device 302, network device 304, network device 306, and network device 308. The network 300 also includes access device 108. In other words, the network 300 may be substantially similar to the network 100 except that access device 108 has been turned on near the network 300, to which it is associated, or has entered an area to which the network 300 can reach.

When access device 108 can enter the network 300 as shown in FIG. 3, access device 108 may be authenticated based on the access device's authentication with the logical network or may otherwise commence communication with cloud network 114. Access device 108 may also communicate notification of its presence or other information directly to other network devices 302-308 within network 300, as shown in FIG. 3 by communication paths 330. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 300, including network device 302, network device 304, network device 306, and network device 308, information/data regarding its status. Such status data may include the fact that it is present and turned on, or other status data/information. At any time that network devices 302, 304, 306 and 308 recognize that access device 108 is present at network 300, the network devices may communicate back to access device 108. For example, the network devices may send an acknowledgement (e.g., ACK signal) back to access device 108 to confirm that they received the status data sent by access device 108. The network devices may also send their own status data to access device 108.

While network devices 302-308 and access device 108 may each receive communication from other network devices around the network 300, including the status of each of those network devices, network devices 302-308 and/or access device 108 may be continuously scanning network 300 (including, for example, running discovery algorithms) to determine whether any devices within the network have moved, turned on/off or otherwise added to or subtracted from the network 300, or have otherwise changed statuses.

Since network devices 302-308 and access device 108 may each receive communication from other devices around network 300, including the status of each of those devices, each network device within network 300 may know the status of each other network device in the network 300. For example, access device 108 or devices 302-308 may not be required to communicate with cloud network 114 in order to obtain one or more of such statuses. Since cloud network 114 is an external network and may be remote from network 300, communication between network devices within the network 300 and cloud 114 may take more time than communication between two devices within network 300. For example, communication between devices within network 300 may take anywhere from 1 millisecond to 100 milliseconds, while communication between a device within network 300 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within the network 300 may choose to send and receive/retrieve statuses directly with other devices within the network 300 instead of communicating such information via cloud network 114. When a network device receives status data from another network device on the device's local area network 300, it may store that status data so that it may retrieve and use that status data at a later time.

Figure 4:
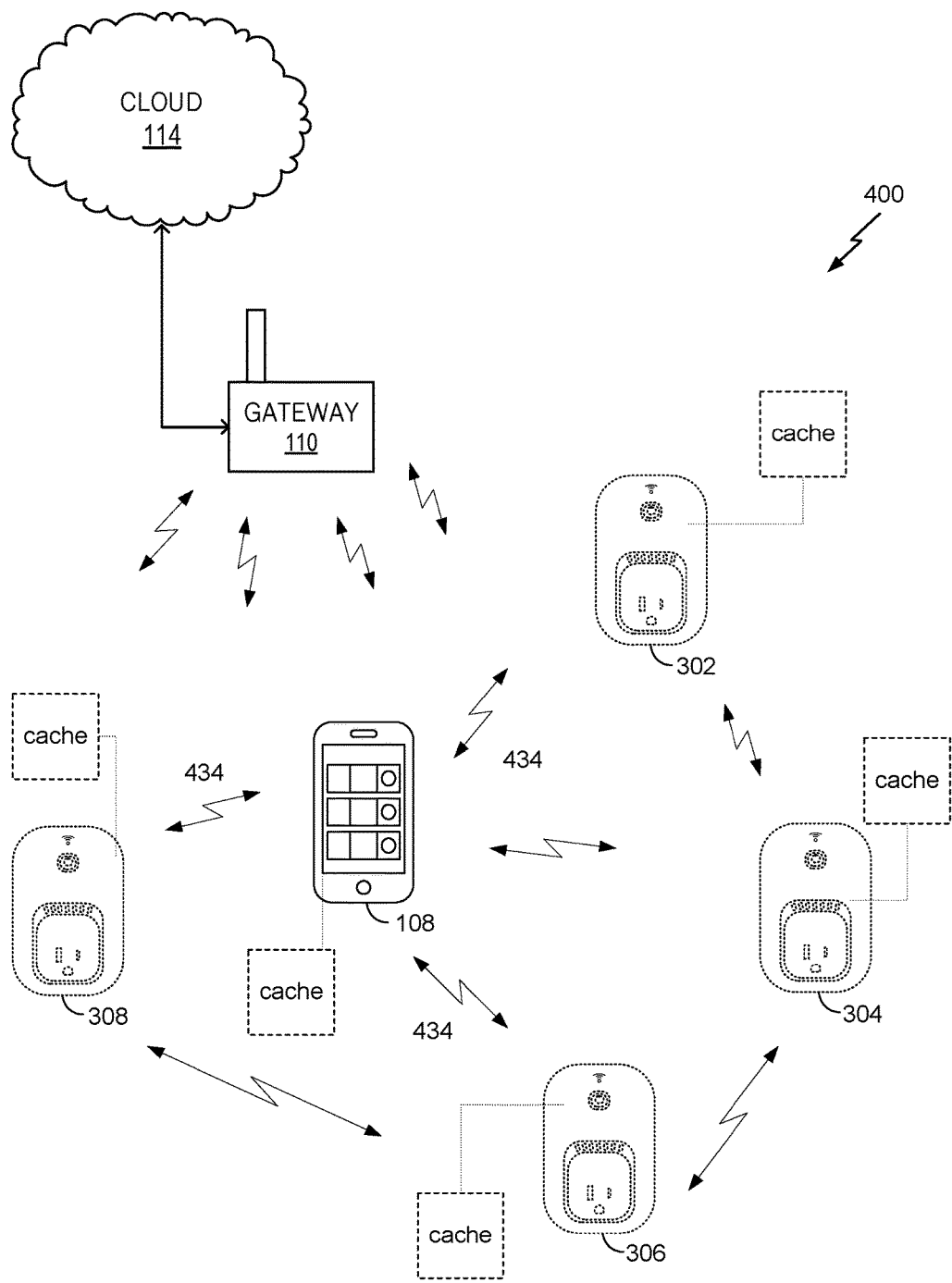
FIG. 4 is an illustration of an example of a network environment, in accordance with an embodiment.

FIG. 4 illustrates an example of a network 400, according to embodiments of the present invention. The local area network 400 may include network device 302, network device 304, network device 306, network device 308, and access device 108. FIG. 4 also illustrates that one or more network devices 302-308 and/or access device 108 may include a storage device, such as a cache, for storing data, including data regarding its own status and data regarding statuses received from the other devices within local area network 400. For example, access device 108 may, after being powered up, broadcast/send its status to network device 308 via communication 434. Network device 308 may store the status data received from access device 108 until the next time access device 108 updates its status by sending new/updated status data to network device 308. Cache may be used for storage within network devices 302-308 and/or access devices within the local area network 400 so that each of the devices may be able to quickly retrieve the data it needs from storage. An application operating on the access device 108 can access the cache to obtain information to display the visual interface for each network device 302-308 registered within the network 400. Although a caching device may be used to store such data within the network and/or access devices within the local area network 400, other types of storage may be used.

The cache can contain a known interface list including interface information for different, known types of devices. The known list can include a record for each network device known by the access device 108 to exist on the network 400. When an application is run on the access device 108, the access device 108 can access the known interfaces in the cache to present the display of access device 108. The display can present one or more visual interfaces, each corresponding to a network device known to exist on the network 400. Each visual interface can be generated based on a visual interface module corresponding to each device on the network 400. In an example, the display can include a visual interface (e.g., a module tile) for each device in the network 400 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 400. For example, the status display can include a speed of a fan (e.g., a fan speed of 56 in a range of values between 0 and 100) of the network device 302 (e.g., a fan), a value of sensitivity of a sensor (e.g., a value of 34 in a range of values 0-100) for the network device 304 (e.g., a motion sensor), a value of brightness (e.g., 65 percent brightness) for the network device 306 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 400 and can use that information to update its own cache, update the status display, and/or pass the information to the cloud network 114 and/or the gateway 110 for trouble shooting and/or storage.

Even though each network device may know and store (e.g. in cache) the state of each other network device within local area network 400, a network device may not know when another network device changes status (e.g. turns/ powers off). However, network devices and/or access devices within local area network 400 may broadcast/send any updates in its status to other devices on the network. For example, if network device 302 changes status, it may send status data to the other network devices, such as network devices 304, 306 and 308 and to access device 108. However, network device 302 may not know which devices to update since the other devices may change statuses periodically (e.g. turn off).

Therefore, a network or access device may subscribe to another network or access device within local area network 400. For example, network devices 304, 306 and 308 and access device 108 may subscribe to status data notifications/ updates from network device 302. Such a subscription may be registered for upon initial connection with network device 302 when network device 302 first enters local area network 400 or at any other time after network device 302 has been associated with local area network 400. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 2. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 302 may store a list of network devices 304, 306 and 308 and access device 108 after those devices subscribe to network device 302. Then, when network device 302 undergoes a change in status, network device 302 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 400, each contain continuously updated statuses of each other device on the network and obtain those statuses and updates through direct communication without necessary use of the cloud.

Figure 5:
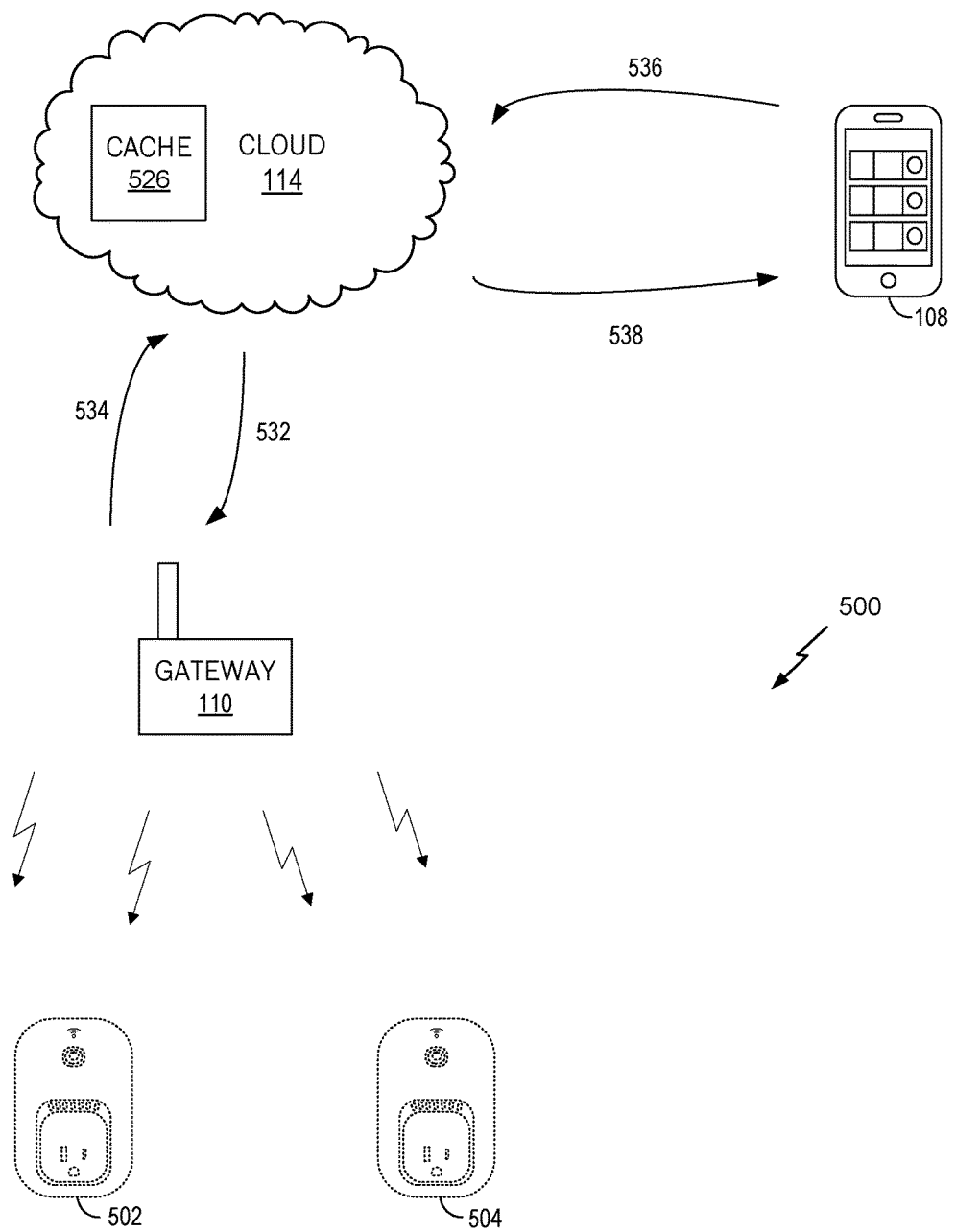
FIG. 5 is an illustration of an example of a network environment, in accordance with an embodiment.

FIG. 5 illustrates an access device 108 that is located remotely from network 500 (e.g. local area network), according to embodiments of the present invention. Local area network 500 includes gateway 110 and network devices 502 and 504 (which may be, for example, the same as any of network devices 302-308 in FIGS. 3 and 4), as shown in FIG. 5. However, network 500 may also include a variety of other network devices and one or more access devices directly connected to network 500. Gateway 110 is connected to cloud network 114, and allows network devices 502 and 504 to connect to cloud 114, the internet, or other external networks via gateway 110. In some embodiments, the network devices 502 and 504 may include home automation devices that allow a user to access, control, and/or configure various home appliances located within the user's home, such as a television, radio, light, microwave, iron, and/or the like.

Access device 108 is not directly connected to network 500. Instead, access device 108 is external to network 500 and may connect to cloud network 114 and to network 500 via cloud network 114. As noted, network devices 502 and 504 may change status on a periodic basis. In some embodiments, even when external to and not directly connected to network 500, an access device may request to check the status of the devices on the network. When access device 108 seeks to check the status of any device on the network, the access device 108 may transmit/send a communication 536 to the cloud network 114, to which all devices on the network are connected either directly or indirectly via gateway 110. Since the cloud network 114 stores an updated table/list of the statuses of each of the devices within the requesting access device's network, the cloud network 114 may transmit a communication 538 of such status data to the access device 108. For example, after network devices 502 and 504 are turned on, authenticated and are a part of network 500, network devices 502 and 504 may communicate their statuses to cloud network 114. Furthermore, any time the status of network devices 502 and 504 changes, the device that incurred a status change may push/send information (e.g. an indication) of that status change to cloud network 114. Cloud network 114 may store, in cache 526 or otherwise, the statuses (which may be time stamped in metadata or otherwise) of network devices 502 and 504. Therefore, when access device 108 requests from cloud network 114 the statuses of devices on network 500, cloud 114 may send its most recently stored/updated statuses to access device 108.

To obtain the most updated status data of devices within network 500, cloud 114 may, upon receiving a request for status data related to network devices 502 and 504, transmit/send a communication 532 (e.g. request, query, etc.) for such status data to network devices 502 and 504 via gateway 110. Once network devices 502 and 504 receive this request, network devices 502 and 504 may send a communication 534 (e.g. updated status data) to cloud 114 to replace the previously stored/cached statuses in cache 526. Upon receipt of updated status data 534 from network 500, cloud 114 may send a communication 538 of such status data to the access device 108.

However, the process of cloud network 114 requesting updated statuses from network devices 502 and 504 within network 500 may cause latency within the system. More specifically, the time required for cloud network 114 to request updated statuses from network devices 502 and 504 and to in turn receive updated statuses from network devices 502 and 504 may be substantially greater than the time required for cloud network 114 to send its currently stored statuses (without being updated) for network devices 502 and 504 to access device 108. For example, of the total time required for access device 108 to receive updated statuses from cloud network 114, 80% or more of that total time may include cloud network 114 requesting updated statuses from network devices 502 and 504. On the other hand, of the total time required for access device 108 to receive updated statuses from cloud network 114, 20% or more of that total time may include the status data being transmitted from cloud network 114 to access device 108. Since a majority of the process required for access device 108 to request and receive status data for network devices 502 and 504 is the transmission of data between cloud 114 and network devices 502 and 504, the access device 108 and cloud network 114 may maximize efficiency by minimizing the effect of the transmission of data between cloud 114 and network devices 502 and 504 on the whole process/system.

Figure 6:
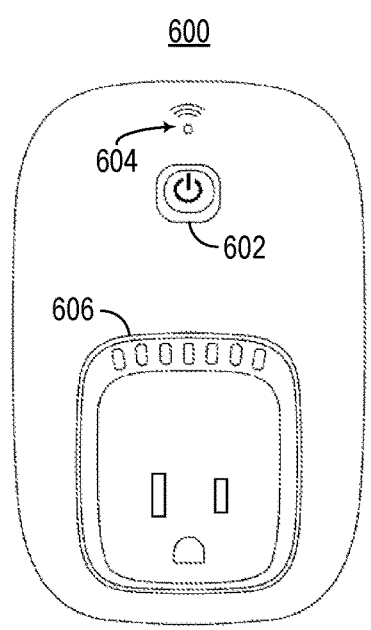
FIG. 6 is an illustration of an example of a front view of a network device, in accordance with an embodiment.
Figure 7:
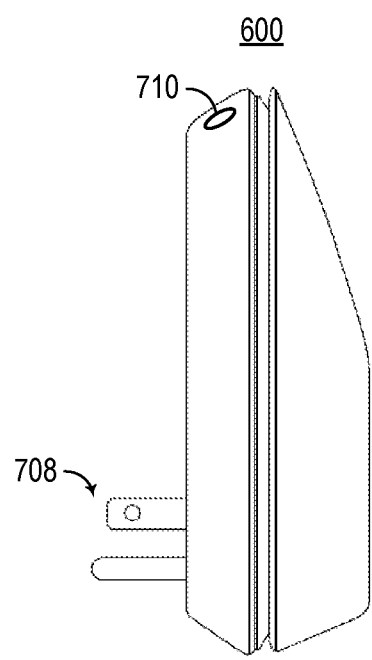
FIG. 7 is an illustration of an example of a side view of a network device, in accordance with an embodiment.

FIG. 6 illustrates an example of a front view of a network device 600. FIG. 7 illustrates an example of a side view of the network device 600. The network device 600 may include any of the network devices 102, 104, or 106 described herein. In some embodiments, the network device 600 may be a home automation network device. For example, the network device 600 may include a home automation switch that may be coupled with a home appliance. A user may wirelessly access the network device 600 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 600 may include a WiFi enabled switch that connects home appliances and other electronic devices to a compatible 802.11b/g/n/ac WiFi network. The network device 600 may thus allow users to locally or remotely turn devices on or off from anywhere, program customized notifications, and/or change device status. The network device 600 may further allow a user to create custom schedules or have devices respond to sunrise or sunset.

The network device 600 includes an power switch 602 that may be depressed in order to turn the network device 600 on and off. In some embodiments, a light source may be integrated with or located behind the power switch. For example, a light-emitting diode (LED) may be located on a circuit board under the power button 602. The light source may be illuminated when the network device 600 is powered on, and may not be illuminated when the network device 600 is powered off.

The network device 600 further includes a communications signal indicator 604. The signal indicator 604 may indicate whether the network device 600 has access to a communications signal, such as a WiFi signal. For example, the signal indicator 604 may include a light source (e.g., a LED) that illuminates when the network device 600 is connected to a communications signal. The light source may depict different colors or other characteristics (e.g., flashing, dimming, or the like) to indicate different levels of signal strength or mode of operation.

The network device 600 includes a restore button 710. The restore button 710 may allow a user to reset the network device 600 to factory default settings. For example, upon being depressed, the restore button 710 may cause all software on the device to be reset to the settings that the network device 600 included when purchased from the manufacturer.

The network device 600 further includes a plug 708 and an outlet 606. The plug 708 allows the network device 600 to be plugged into a wall socket, such as a socket providing 120V, 220V, or the like. In turn, an appliance may be plugged into the outlet 606. Once the network device 600 is registered according to the techniques described above, an appliance plugged into the socket 606 may be controlled by a user using an access device (e.g., access device 108).

Figure 8:
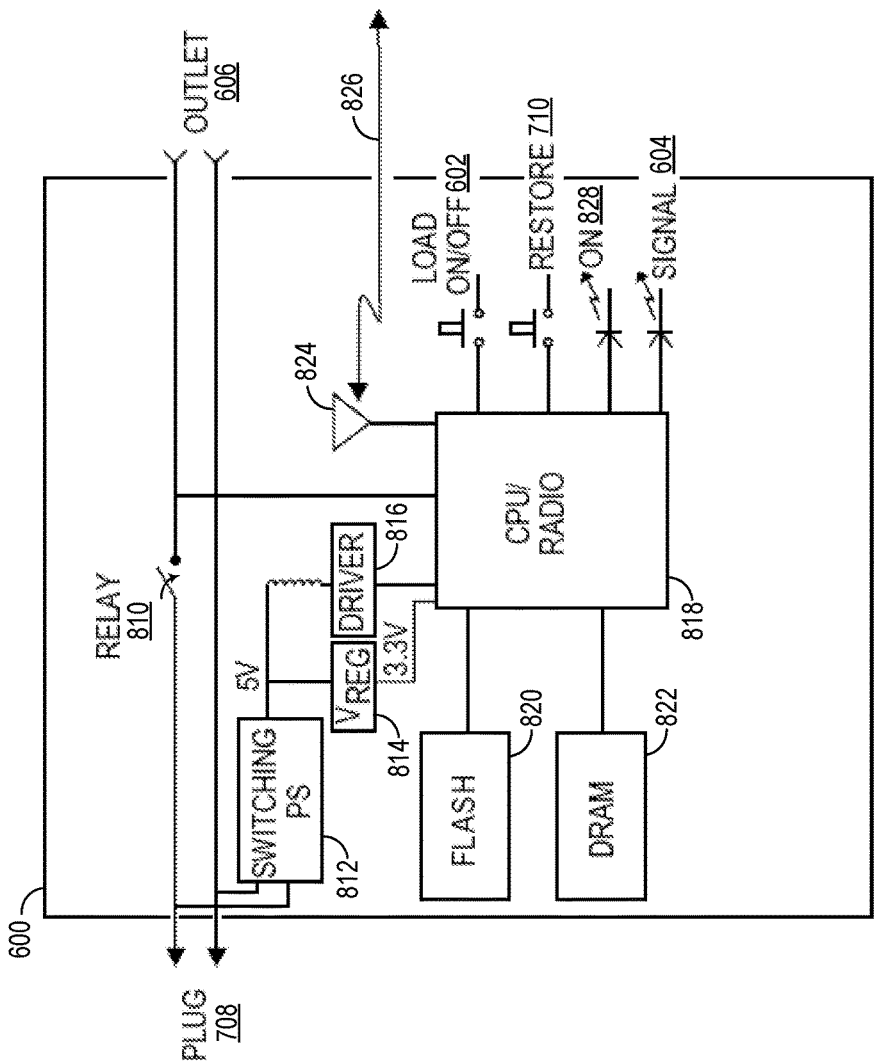
FIG. 8 is an example of a block diagram of a network device, in accordance with an embodiment.

FIG. 8 is an example of a block diagram of the network device 600 depicting different hardware and/or software components of the network device 600. As described above with respect to FIGS. 6 and 7, the network device 600 includes the outlet 606, the plug 708, the power button 602, the restore button 710, and the communications signal indicator 604. The network device 600 also includes light source 828 associated with the power button 602. As previously described, the light source 828 may be illuminated when the network device 600 is powered on.

The network device 600 further includes a relay 810. The relay 810 is a switch that controls whether power is relayed from the plug 708 to the outlet 606. The relay 810 may be controlled either manually using the power button 602 or remotely using wireless communication signals. For example, when the power button 602 is in an ON position, the relay 810 may be closed so that power is relayed from the plug 708 to the outlet 606. When the power button 602 is in an OFF position, the relay 810 may be opened so that current is unable to flow from the plug 708 to the outlet 606. As another example, an application or program running on an access device may transmit a signal that causes the relay 810 to be opened or closed. For instance, an access application may display a graphical interface on the access device that includes a power button. The user may tap or otherwise select the power button, and the access application may send a communication signal (e.g., over a WiFi network) to the network device 600 instructing the network device 600 to open or close the relay 810.

The network device 600 further includes flash memory 820 and dynamic random access memory (DRAM) 822. The flash memory 820 may be used to store instructions or code relating to an operating system, one or more applications, and any firmware. The flash memory 820 may include nonvolatile memory so that any firmware or other program can be can updated. In the event the network device 600 loses power, information stored in the flash memory 820 may be retained. The DRAM 822 may store various other types of information needed to run the network device 600, such as all runtime instructions or code.

The network device 600 further includes a CPU/Radio 818. The CPU/Radio 818 controls the operations of the network device 600. For example, the CPU/Radio 818 may execute various applications or programs stored in the flash memory 820 and/or the dynamic random access memory (DRAM) 822. The CPU/Radio 818 may also receive input from the various hardware and software components, interpret the input, and perform one or more functions in response to the input. As one example, the CPU/Radio 818 may determine whether the power button 602 has been pressed, and determines whether the relay 810 needs to be opened or closed. The CPU/Radio 818 may further perform all communications functions in order to allow the network device 600 to communicate with other network devices, one or more gateways, a cloud network, and/or one or more access devices. While the CPU and radio of the network device 600 are shown to be combined in the CPU/Radio 818, one of ordinary skill in the art will appreciate that, in some embodiments, the CPU and radio may be separately located within the network device 600. For example, CPU circuitry may be situated at a separate location on a circuit board from the location of radio circuitry, the CPU circuitry may be located on a different circuit board from the radio circuitry, or the like. Further, the network device 600 may include multiple radios that are configured to communicate using one or more communication protocols, such as any combination of a WiFi™ transceiver radio, a Bluetooth™ transceiver radio, a Zigbee™ transceiver radio, a UWB transceiver radio, a WiFi-Direct transceiver radio, a BLE transceiver radio, and/or any other wireless network transceiver radio or interface. In some embodiments, the network device 600 does not include a cellular network transceiver radio or interface, and thus may not be configured to directly communicate with a cellular network. In some embodiments, the network device 600 may include a cellular network transceiver radio, and may be configured to communicate with a cellular network using the cellular network transceiver radio.

The network device 600 may communicate with other devices and/or networks via antenna 824. For example, antenna 824 may include a 2.4 GHz antenna, a 5 GHz antenna, or the like, that can transmit and receive WiFi communications signals. The network device 600 may include other types of antennas that can communicate Bluetooth® signals, Zigbee® signals, Ultra-Wideband (UWB) signals, WiFi-Direct signals, BLE signals, and/or the like. In some embodiments, the antenna 824 may be configured to communicate different types of signals, such as the WiFi signals, Bluetooth® signals, Zigbee® signals, UWB signals, WiFi-Direct signals, BLE signals, and/or the like. In some embodiments, the network device 600 may include multiple antennas for communicating the different types of communication signals. As one example, the network device 600 may include both a 2.4 GHz antenna and a 5 GHz antenna.

The network device 600 further includes a driver 816, a switching power supply 812, and a voltage regulator 814. The driver 816 may include instructions or code that can be used to translate control signals or commands received from applications running on the DRAM 822 to commands that the various hardware components in the network device 600 can understand. In some embodiments, the driver 816 may include an ambient application running on the DRAM 822. The switching power supply 812 may be used to transfer power from the outlet in which the plug 708 is connected to the various loads of the network device 600 (e.g., CPU/Radio 818). The switching power supply 812 may efficiently convert the voltage and current characteristics of the electrical power to a level that is appropriate for the components of the network device 600. For example, the switching power supply 812 may perform AC-DC conversion. In some embodiments, the switching power supply 812 may be used to control the power that is relayed from the plug 708 to the outlet 606. The voltage regulator 814 may be used to convert the voltage output from the switching power supply 812 to a lower voltage usable by the CPU/Radio 818. For example, the voltage regulator 814 may regulate the DC voltage from 5V to 3.3V.

In various embodiments, functions may be stored as one or more computer-program products, such as instructions or code, in a non-transitory machine-readable storage medium, such as the flash memory 820 and/or the DRAM 822. The network device 600 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 2, may be implemented as code and/or instructions executable by a computer (and/or a processor within a computer); in an aspect, then, such code and/or instructions can be used to configure and/or adapt a computer (or other device) to perform one or more operations in accordance with the described methods. Such functions or code may include code to perform the steps described above with respect to FIG. 2. The memory, such as the flash memory 820 and/or the DRAM 822, may be a processor-readable memory and/or a computer-readable memory that stores software code (programming code, instructions, etc.) configured to cause a processor(s) within the CPU/Radio 818 to perform the functions described. In other embodiments, one or more of the functions described may be performed in hardware.

A set of these instructions and/or code might be stored on a non-transitory machine-readable storage medium, such as the flash memory 820 and/or the DRAM 822. In some cases, the storage medium might be incorporated within a computer system, such as the CPU/Radio 818. In other embodiments, the storage medium might be separate from a computer system (e.g., a removable medium, such as a compact disc), and/or provided in an installation package, such that the storage medium can be used to program, configure and/or adapt a computer with the instructions/code stored thereon. These instructions might take the form of executable code, which is executable by the network device 600 and/or might take the form of source and/or installable code, which, upon compilation and/or installation on the network device 600 (e.g., using compilers, installation programs, compression/decompression utilities, etc.) then takes the form of executable code.

It should be appreciated that the network device 600 may have other components than those depicted in FIGS. 6-8. Further, the embodiment shown in the figures are only one example of a network device that may incorporate an embodiment of the invention. In some other embodiments, network device 600 may have more or fewer components than shown in the figure, may combine two or more components, or may have a different configuration or arrangement of components.

Figure 9:
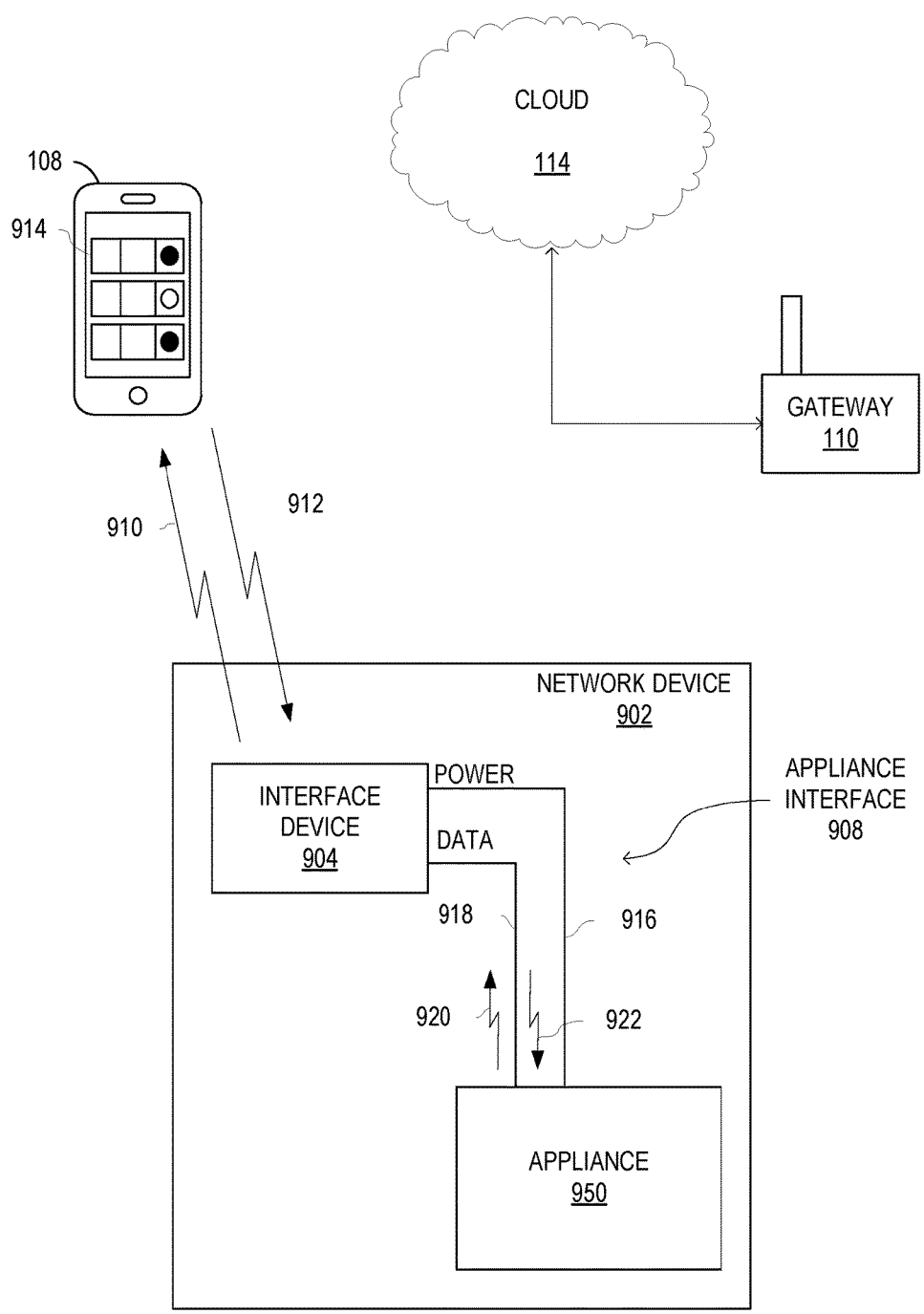
FIG. 9 is a schematic illustration of a local area network including a network device that includes an appliance, in accordance with an embodiment.

FIG. 9 is a schematic illustration of a local area network 900 including a network device 902 that includes an appliance 950. The network device 902 can comprise an interface device 904 and the appliance 950 connected by an appliance interface 908. The appliance interface 908 can include a data connection 918 and a power connection 916. The data connection 918 can be a serial connection (e.g., RS-232, USB, or other), or any other suitable data connection. The interface device 904 can be fully powered by the appliance 902 through the power connection 916, or can have a separate source of power.

The appliance 950 can be any suitable electric device, such as a crock pot, space heater, an iron, a washing machine, a dishwasher, a lamp, a radio, a computer, an amplifier, or another electrical device. Additional examples of suitable electrical devices include electrical devices incorporated into or with non-electrical devices, such as an actuator system in an electrically-actuated deadbolt, a sensing system in a seat cushion, or other suitable electrical device incorporated into or with a non-electrical device. The appliance 950 can be adapted to operate with the interface device 904. The appliance 950 can be any finite state machine. The appliance 950 can, but need not, know or store one or more states related to the appliance. For example, the appliance 950 may know or store data related to whether the appliance 950 is turned on, how long the appliance has been on (or off), among other status data.

The interface device 904 can be positioned within the housing of the appliance 950, or can be attached externally to the appliance 950. The interface device 904 can be removable from the appliance 950, or can be permanently installed in or on the appliance 950.

The interface device 904 can be connected to the local area network 900 through a network interface. The interface device 904 can be connected by a wired or wireless connection (e.g., WiFi, Zigbee, or others described herein or well known). In some embodiments, the interface device 904 can be connected directly to the cloud network 114 through a cellular internet connection (e.g., EDGE, LTE, or others).

The interface device 904 can communicate with another network device, an access device 108, or another client device through the network interface 906. The interface device 904 can transmit a status information signal 910 with status information to the access device 108, and the access device 108 can transmit a network device control signal 912 to the interface device 904. The status information signal 910 and the network device control signal 912 can be transmitted between the interface device 904 and the access device 108 using a telecommunications network (e.g., a cellular network, or other suitable broadband network), using a local area network 900 (e.g., through a gateway 110), or using the cloud network 114, although such a signal may pass through an intermediary device or network to do so.

The interface device 904 can interpret the network device control signal 912 and perform actions based on the contents of the network device control signal 912. The network device control signal 912 can include commands that can be performed by the interface device 904 itself. The network device control signal 912 can also include commands that are to be performed by the appliance 950. Commands that are to be performed by the appliance 950 can include commands like turn on or off, set a desired temperature (e.g., heat up or cool down to 215° F. or any other temperature), or other suitable commands depending on the particular appliance. The interface device 904 can interpret the network device control signal 912 and can send out a command 922, through the data connection 918 of the appliance interface 908, based on the network device control signal 912. The appliance 950 can then perform the command indicated in the network device control signal 912.

The interface device 904 can also transmit commands to the appliance 950 that are not based on a network device control signal received from the access device 108, but are rather based on programming in the interface device 904. Examples of such commands can include commands to update a communication rate, commands to check a state of the appliance 950, commands to set or get a clock time of the appliance 950, or any other suitable commands.

The interface device 904 can receive, through the data connection 918 of the appliance interface 908, a response (e.g., response 920) to any command from the appliance 950. In some examples, the response 920 can include an indication that the command 922 was received. In some examples, the response may include only an indication that a command is received (e.g., an ACK). In some examples, the response 920 can include information for some value on the appliance 950, such as an "on/off" state, a serial number, a product identification, a manufacturer identification, a temperature, a time since live, a setting, or any other value retrievable from the appliance 950. The interface device 904 can interpret the value and can send information about the value (e.g., the state of the appliance is "on," the temperature of the appliance, the time since the appliance first turned on, or other information) as status information (e.g. using status information signal 910) to the access device 108. Additionally, the interface device 904 can send status information about itself (e.g., time since live, supplied power, signal strength, and others) as status information (e.g. using status information signal 910) to the access device 108.

The interface device 904 can also use responses (e.g., response 920) from the appliance 950 to perform additional functions at the interface device 904, such as error handling. In some cases, when performing the additional functions, the interface device 904 does not transmit any status information 910 to the access device 108 based on those particular responses.

The access device 108 can include one or more display tiles (e.g., display tile 914) for displaying information and controls corresponding to the network device 102.

In some embodiments, the interface device 904 can transmit a heartbeat command (e.g., command 922) over the data connection 918 to the appliance 902 to determine whether the appliance 950 is working properly and/or in a state of readiness. If the interface device 904 determines that the appliance 950 has had some sort of failure (e.g., the appliance 950 sends a response 920 indicating a failure or the interface device 904 does not receive any response 920), the interface device 904 can take corrective action (e.g., restarting the appliance 950 or an element of the appliance 950), can log the event, or can alert the user).

Figure 10:
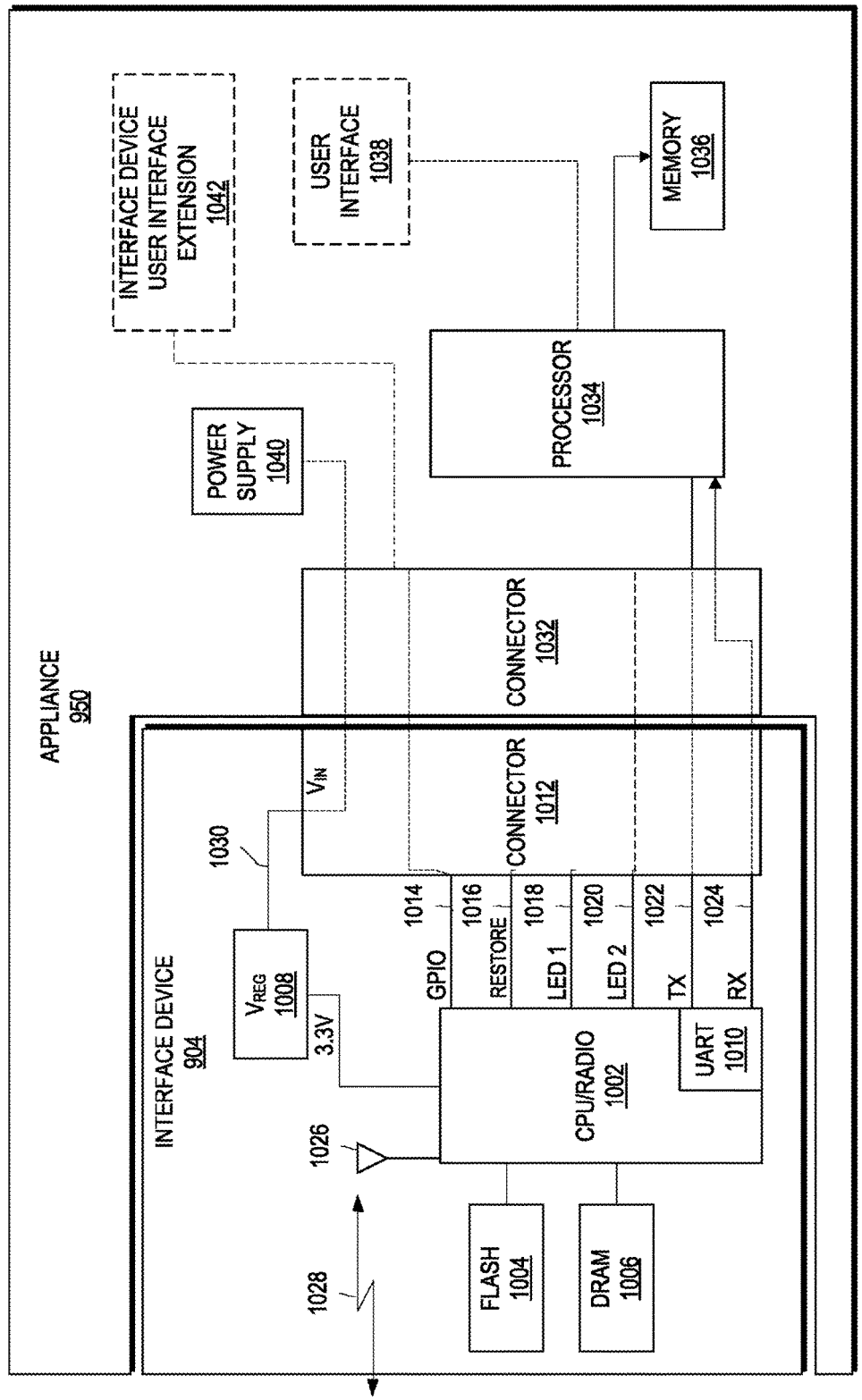
FIG. 10 is an example of a block diagram of a network device including an interface device attached to an appliance, in accordance with an embodiment.

FIG. 10 depicts a block diagram of a network device including an interface device 904 attached to an appliance 950 according to one embodiment. The interface device 904 can include connector 1012 that interacts with connector 1032 of the appliance 950.

The interface device 904 can include flash memory 1004 and dynamic random access memory (DRAM) 1006. The flash memory 1004 may be used to store instructions or code relating to an operating system, one or more applications, and any firmware. The flash memory 1004 can be used to store a cache. The flash memory 1004 may include non-volatile memory so that any firmware or other program can be can updated. In the event the interface device 904 loses power, information stored in the flash memory 1004 may be retained. The DRAM 1006 may store various other types of information needed to run the interface device 904, such as all runtime instructions or code. The flash memory 1004 or DRAM 1006 or a combination thereof may include all instructions necessary to communicate with an appliance 950, including all instructions necessary to communicate using the appliance serial protocol disclosed herein.

The interface device 904 further includes a CPU/Radio 1002. The CPU/Radio 1002 can control the operations of the interface device 904. For example, the CPU/Radio 1002 may execute various applications or programs stored in the flash memory 1004 and/or the dynamic random access memory (DRAM) 1006. The CPU/Radio 1002 may also receive input from the appliance 950, interpret the input, and perform one or more functions in response to the input. The CPU/Radio 1002 may further perform all communications functions in order to allow the interface device 904 to communicate with other network devices, one or more gateways, a cloud network, and/or one or more access devices. The interface device 904 may communicate with other devices and/or networks via antenna 1026. For example, antenna 1026 may include a 2.4 GHz antenna that can transmit and receive WiFi communications signals 1028. The antenna 1026 may include other types of antennas that can communicate Bluetooth® signals, Zigbee® signals, Ultra-Wideband (UWB) signals, and/or the like. In some embodiments, the interface device 904 may include multiple antennas for communicating different types of communication signals.

The CPU/Radio 1002 can include at least one universal asynchronous receiver/transmitter (UART) 1010. The CPU/Radio 903 can use the UART 1010 to send and receive serial communications. The CPU/Radio 903 can send data through a transmit line 1022 and a receive data through a receive line 1024. The CPU/Radio 903 can send and receive data through the transmit line 1022 and receive line 1024 using a serial protocol, such as RS232. The CPU/Radio 1002 can also include an input/output (GPIO) line 1014, a restore line 1016, an LED 1 line 1018, and an LED 2 line 1020. The CPU/Radio 1002 can have additional or fewer lines as necessary. The GPIO line 1014 can be used for any suitable function, such as powering an indicator light on an appliance 950 or accepting an input from the appliance 950. A signal sent on the restore line 1016 can be used to restore the CPU/Radio 1002 and/or the interface device 904 to factory defaults. The LED 1 line 1018 and LED 2 line 1020 can be used to power first and second LEDs that can be used to indicate various statuses, such as whether the interface device has a network connection and whether the interface device is powered on.

The interface device 904 further includes a voltage regulator 1008. The voltage regulator 1008 may be used to convert the voltage output from the appliance 950 to a voltage usable by the CPU/Radio 1002. For example, the voltage regulator 1008 may regulate the DC voltage from 5V to 3.3V. The voltage regulator 1008 can be supplied with power from a power line 1030.

Each of the interface lines, including the GPIO line 1014, the restore line 1016, the LED 1 line 1018, the LED 2 line 1020, the transmit line 1022, the receive line 1024, the power line 1030, and any additional lines, can be routed through connector 1012. Connector 1012 can be a proprietary or universal connector. Any appliance 950 to which the interface device 904 is attached through the connector 1012 can have the necessary hardware to make use of the interface lines, such as to provide power to the power line 1030 and to provide the first and second LEDs that are driven by the LED 1 line 1018 and LED 2 line 1020.

In alternate embodiments, some interface lines are not routed through the connector 1012. For example, the power line 1030 can be routed to a power supply attached directly to the interface device 904, and the LED 1 line 1018 and LED 2 line 1020 can be routed to first and second LEDs located within the interface device 904.

In various embodiments, functions may be stored as one or more instructions or code in memory, such as the flash memory 1004 and/or the DRAM 1006. The interface device 904 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed below may be implemented as code and/or instructions executable by a computer (and/or a processor within a computer); in an aspect, then, such code and/or instructions can be used to configure and/or adapt a device (e.g. a specialty computer) to perform one or more operations in accordance with the described methods. Such functions or code may include code to perform various steps described below. The memory, such as the flash memory 1004 and/or the DRAM 1006, may be a processor-readable memory and/or a computer-readable memory that stores software code (programming code, instructions, etc.) configured to cause a processor(s) within the CPU/Radio 1002 to perform the functions described. In other embodiments, one or more of the functions described may be performed in hardware.

A set of these instructions and/or code might be stored on a computer-readable storage medium, such as the flash memory 1004 and/or the DRAM 1006. In some cases, the storage medium might be incorporated within a computer system, such as the CPU/Radio 1002. In other embodiments, the storage medium might be separate from a computer system (e.g., a removable medium, such as a compact disc), and/or provided in an installation package, such that the storage medium can be used to program, configure and/or adapt a device (e.g. a computer) with the instructions/code stored thereon. These instructions might take the form of executable code, which is executable by the interface device 904 and/or might take the form of source and/or installable code, which, upon compilation and/or installation on the interface device 904 (e.g., using any of a variety of compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

The interface device 904 may have other components than those depicted in FIG. 10. Further, the embodiment shown in the figures are only one example of an interface device that may incorporate an embodiment of the invention. In some other embodiments, interface device 904 may have more or fewer components than shown in the figure, may combine two or more components, or may have a different configuration or arrangement of components.

The appliance 950 can have a processor 1034. The processor 1034 can be a microcontroller, such as a Peripheral Interface Controller (PIC). The appliance 950 can include a memory 1036 (e.g., a flash memory or other) that is readable by the processor 1034. The memory 1036 can include instructions enabling the innate functionality of the appliance 950, such as heating and timing for a crock pot.

The appliance 950 can include a user interface 1038. The user interface 1038 can provide buttons, displays, LEDs, knobs, and other input and output elements necessary for a user to interact with the appliance 950. For example, a user interface 1038 for a slow cooker can include a display, a power button, a temperature adjustment button, and a start button. The user interface 1038 can be driven and/or monitored by the processor 1034. In some embodiments, the appliance 950 is "headless" or has no user interface 1038.

The appliance 950 can include a power supply 1040 that can provide power to the voltage regulator 1038 of the interface device 904 through connector 1032, connector 1012, and power line 1030.

The appliance 950 can include an interface device user interface extension 1042. The interface device user interface extension 1042 can include various input and output elements that are passed directly to the interface device 904 without being processed by the processor 1034. Examples of input and output elements of the interface device user interface extension 1042 include LEDs associated with the LED 1 line 1018 and LED 2 line 1020, a hardware restore button associated with the restore line 1016, or any other suitable input/output element.

Figure 11:
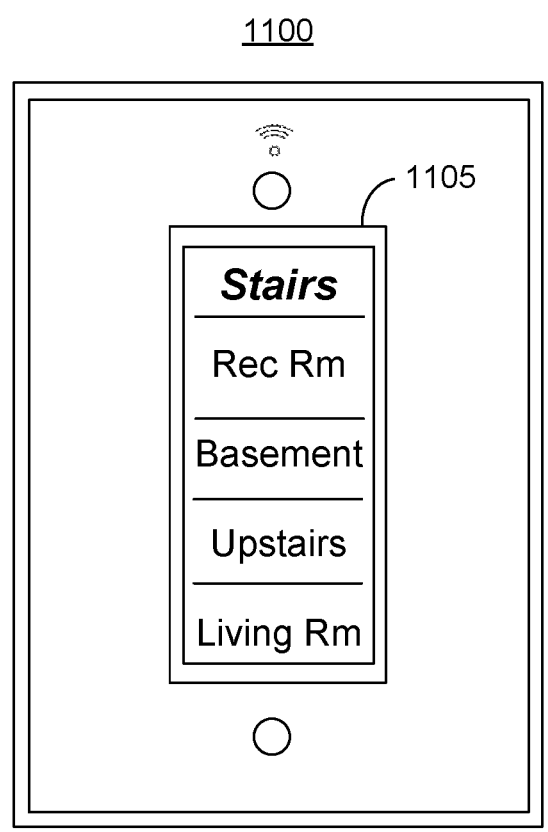
FIG. 11 is an illustration of a network device with a virtual interface, in accordance with an embodiment.

FIG. 11 illustrates a network device 1100 with a virtual interface. Device 1100 includes an interactive display 1105 that can include one or more virtual options or buttons. In the depicted scenario, display 1105 includes five options. In this instance, each option corresponds to a home location, and each home location can correspond to one or more lights. For example, pressing the "stairs" option can cause one light bulb in one light fixture in a stairwell to change its on-off state, pressing the "basement" option can cause all lights in all light fixtures to turn to a particular power state (and a second press could cause the particular power state to reverse), pressing the "living room" option can cause two bulbs in one light fixture in the living room to change its power state, etc.

In one instance, one option is temporarily selected. For example, "stairs" may be a default option that is initially selected upon detecting motion or input (e.g., a tap on the display). A user can then slide another option to a top of the display to temporarily select that option (e.g., by touching and dragging on the display). Another input (e.g., a tap on the display or a press of a button on device 1100) can cause the selected option to be confirmed and one or more lights associated with the option to be controlled.

In one instance, tapping an option causes display 1105 to change to show information and/or detailed options pertaining to the tapped option. For example, receiving input corresponding to selection of "Rec Rm" such as by tapping on the display, can cause a screen to be displayed that indicates that there are 4 light fixtures in the rec room, 2 of which are on, and present options to change the power state (and/or light intensity) of individual lights and/or to cause all lights to be set to a same identified power state (and/or light intensity).

Figure 12A:
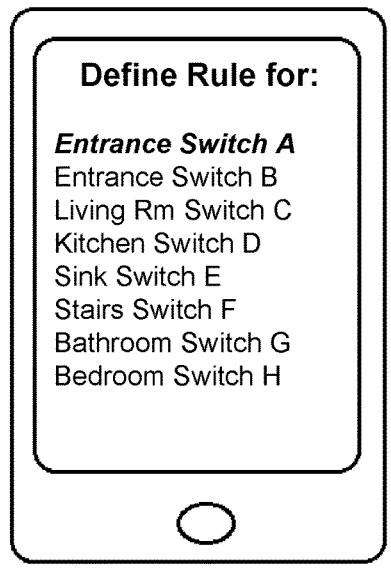

FIGS. 12A-12F illustrate a series of example interfaces at a device (e.g., an access device) for receiving user input to define a rule according to an embodiment of the invention. As shown in FIG. 12A, a set of devices for which a rule can be defined can be presented. Each identified device can be one that, for example, can serve as a secondary device to detect a stimulus and subsequently influence operation of another device. In the depicted illustration, each identified device is a switch device and is identified both based on room location and letter. In this example, input is received corresponding to selection of "Entrance Switch A".

Figure 12B:
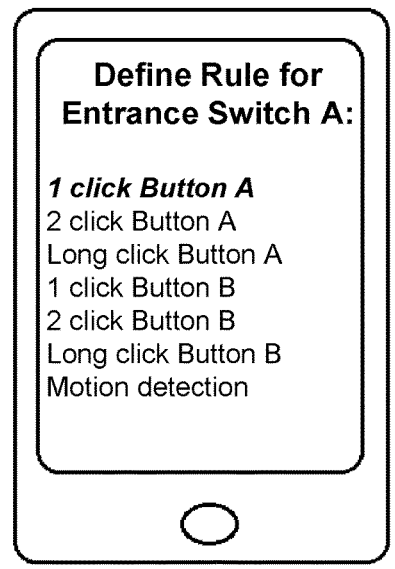

A presentation shown in FIG. 12B identifies the type of stimuli that can be detected by Entrance Switch A. Entrance Switch A includes two buttons (A and B), each of which can detect and distinguish between a single click, a double click and a long click. Switch A can also detect motion. In this example, input is received corresponding to selection of "1 click Button A" such that detection of this type of stimulus will serve as a trigger for the rule.

Figure 12C:
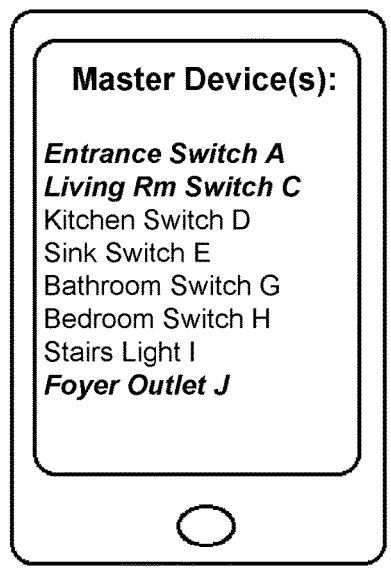

A presentation shown in FIG. 12C identifies a set of master devices. The list can include, for example, all network devices, all master network devices, all network or master devices of a specific type and/or all network or master devices detected as currently or previously having a load. In this example, Entrance Switch B and Stairs Switch F are omitted from the list, as they are not master devices electrically connected to a load. In this example, input is received corresponding to selection of three master devices: Entrance Switch A, Living Room Switch C and Foyer Outlet J.

Figure 12D:
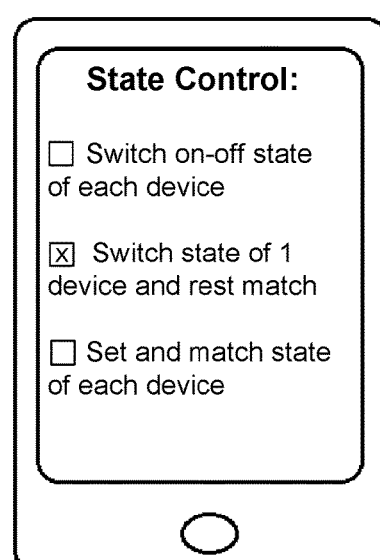

A presentation shown in FIG. 12D identifies potential types of state control. A first option would cause each master device to change its on-off state. Thus, if just prior to detection of a Button A click, the Entrance Switch is on and the Living Room Switch is off, selection of the first option would cause the Entrance Switch to turn off and the Living Room Switch to turn on. A second option is to cause one of the devices' states to switch from a current state to an opposite state and for the rest of the devices to switch to or stay in the opposite state. A third option is to cause all of the devices to enter a particular state (e.g., each device to change to or stay in an "off" state). In this example, input is received corresponding to selection of the second option.

The second option requires identification of which device will govern the other devices' states. A presentation in FIG. 12E allows for selection of this device (e.g., by clicking on "Entrance Switch A" which can cause identifications of each identified master device to be presented in, for example, a pull-down menu). The presentation further allows for selection of an intensity for each of two opposing states. The presentation includes two sliders. In this example, input is received corresponding to setting 90% along the first slider and 0% along the second slider.

A presentation shown in FIG. 12F identifies a rule based on the provided inputs. Specifically, when a single click of Button A is detected at Entrance Switch A, it can cause a state of Entrance Switch A to change. When Switch A is in an on state, it will change to an off state and the converse. For example, when it changes to an on state, the intensity will be 120%, and when it changes to an off state, the intensity will be 0%. The living room switch and foyer outlet will also change (if needed) to match Switch's A updated state. A user can be presented with an opportunity to confirm or modify the rule. Upon confirmation, the rule can be sent to one, more or all network devices.

The presentations at one or more of FIGS. 12A-12F may be initiated based on, for example, detection of user input and/or automatic detection. For example, a user can provide input corresponding to a request to define a rule, after which the presentation of FIG. 12A may be shown. As another example, an automatic detection can detect that a new device joined a network, that a device on a network is not associated with a rule triggered by at least one type of input that can be received at the device (or with any rule), or that a characteristic (e.g., location) of a device changed. The automatic detection can, in some instances, correspond to identifying a device (and, in some instances, an input type), which can cause a presentation such as one shown in FIG. 12B or 12C to be shown.

Figure 13:
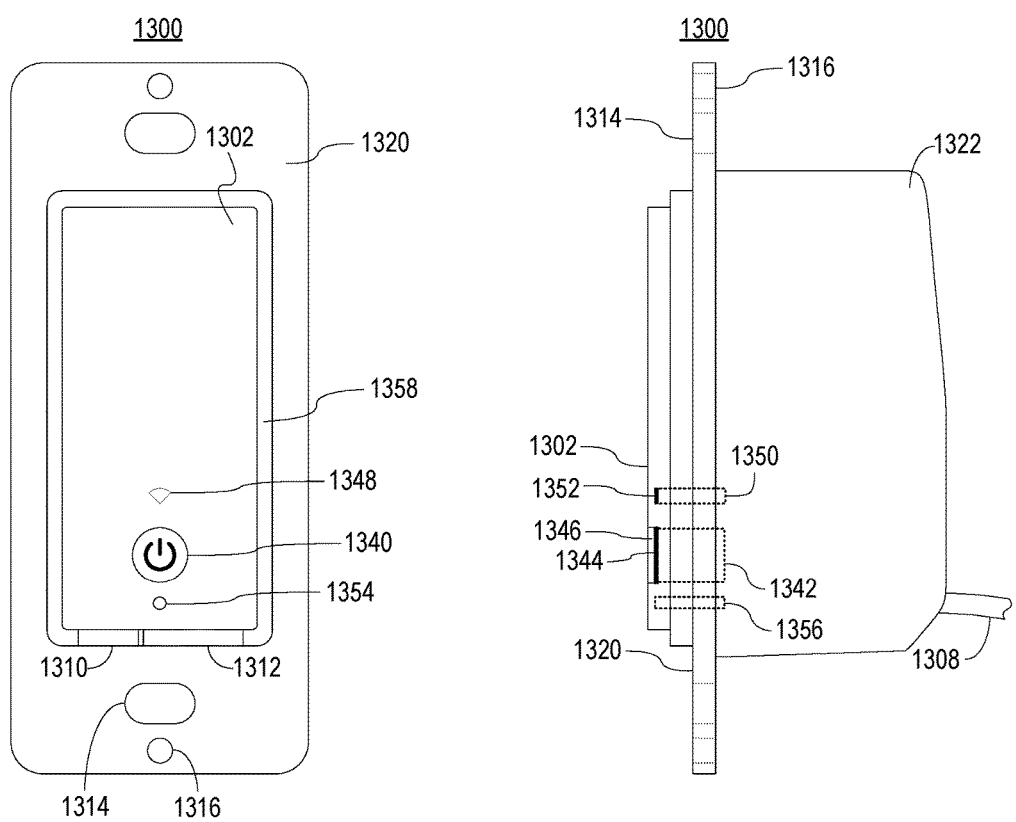
FIG. 13 is an illustration of an example of front and side views of a network device, in accordance with an embodiment.

FIG. 13 illustrates example views of a network device 1300, with the left panel showing a front view and the right panel showing a side view. The network device 1300 is stylized as an in-wall light switch style structure. The network device 1300 may include any of the network devices 102, 104, or 106 described herein. In some embodiments, the network device 1300 may be a home automation network device. For example, the network device 1300 may include a home automation switch that may be coupled with a home appliance. A user may access the network device 1300 in order to control, and/or configure various home appliances located within the user's home. The user may access the network device 1300 remotely (e.g., wirelessly). For instance, the user may remotely control appliances such as a television, radio, light, microwave, iron, space heater, wall A/C unit, washer, dryer, fan, and/or the like.

In some embodiments, the network device 1300 may include a WiFi enabled switch that connects home appliances and other electronic devices to a compatible 802.11b/g/n/ac WiFi network. The network device 1300 may thus allow users to locally or remotely turn devices on or off from anywhere, program customized notifications, and/or change device status, position, speed or level, among other types of control. The network device 1300 may further allow for creation of custom schedules or to enable devices respond to sunrise or sunset, indoor or outdoor temperature, audio level, light level, sensor conditions, etc.

The network device 1300 can include a primary switching element 1302 (e.g., a power switch) that may be depressed in order to change a power state of an electrical device drawing power through network device 1300. In the embodiment shown in FIG. 13, primary switching element 1302 is configured similar to a decorator style rocker switch, but with a push-button (e.g., momentary) configuration instead of a two-state (i.e., on/off) configuration. Other configurations of a primary switching element 1302 can be used. The room-facing side 1320 can include one or more primary switching elements 1302, some of which may be used to send a wireless signal and/or command from the network device 1300 to change the power state of an electrical device drawing power through the network device 1300.

In some embodiments, one or more light sources may be integrated with or located behind the room-facing side 1320, such as behind a primary switching element 1302. For example, a light-emitting diode (LED) may be located on a circuit board under the primary switching element 1302. The light source may be illuminated when the network device 1300 is providing power to the electrical device, and may not be illuminated when the network device 1300 is not providing power to the electrical device, or vice versa. In the embodiment shown in FIG. 13, primary switching element 1302 is configured similar to a decorator style rocker switch, but with a push-button configuration instead of a two-state (i.e., on/off) configuration. Any display can be presented using a light source and optionally one or more of a light pipe to direct the light source, a mask to provide a user-recognizable pattern to the light source, and a lens.

In other embodiments, a variable level switch, such as a dimmer type switch, is provided on the room-facing side 1320 of the network device 1300. In further embodiments, a touch screen display is provided on the room-facing side 1320 of the network device 1300, such as to allow a multitude of different inputs, such as to control and program the network device 1300. Including a touch screen display on the network device 1300, for example, optionally provides for the ability to use the network device 1300 as both a network device (102, 104, 106) and an access device 108.

The network device 1300 further includes a communications signal indicator. The signal indicator may indicate whether the network device 1300 has access to a communications signal, such as a WiFi signal. For example, the signal indicator may include a light source (e.g., a LED) that illuminates when the network device 1300 is connected to a communications signal. The light source may depict different colors or other characteristics (e.g., flashing, dimming, or the like) to indicate different levels of signal strength or mode of operation.

The network device 1300 includes a restore button 1310. The restore button 1310 may allow a user to reset the network device 1300 to factory default settings. For example, upon being pressed, the restore button 1310 may cause all software on the device to be reset to the settings that the network device 1300 included when purchased from the manufacturer. Resetting these settings to factory default can include removing wireless access settings (e.g., SSID, password, and others), network IDs, security keys, saved rules, stored names and/or images, user settings, and other information.

In some embodiments, the restore button 1310 can respond only to certain predetermined patterns of being pressed, such as press-and-hold, multiple presses, or multiple presses and hold. In some embodiments, the restore button 1310 can respond to different patterns of being pressed with different results, such as restoring the network device 1300 to factory defaults when the button is pressed and held for a certain length of time (e.g., five seconds), but only removing the wireless access settings (e.g., not removing saved rules, stored names, and/or stored images) when the button is pressed five times in quick succession and then held for ten seconds. In some embodiments, the restore button 1310 can be used to only reset the user-defined rules and/or other user-defined settings of the network device 1300, without removing any wireless access settings, for example if a user desired to use the network device 1300 within the same network, but for a different purpose (e.g., moving the network device 1300 to a different room).

The restore button 1310 can be located on the room-facing side 1320 such that the button is readily accessible by a user while the network device 1300 is installed in a wall. In one embodiment, the restore button 1310 is located inline with a bezel 1358. The restore button 1310 can be shaped to follow the contour and shape of the bezel 1358 so as to remain unobtrusive. The primary switching element 1302 can extend past the bezel 1358 so that the restore button 1310 is not inadvertently pressed.

The network device 1300 also includes a restart button 1312. The restart button 1312 may allow a user to cycle the power of network device 1300. For example, upon being pressed, the restart button 1312 may cause the network device to reboot, simulating disconnection from and reconnection to line power (e.g., an electrical supply). In some embodiments, the restart button 1312 can physically disconnect power to one or more elements (e.g., processors) of the network device 1300. In other embodiments, the restart button 1312 can simply provide a reset signal to one or more elements (e.g., processors) of the network device 1300 to cause such elements to restart.

The restart button 1312 can be located on the room-facing side 1320 such that the button is readily accessible by a user while the network device 1300 is installed in a wall. In one embodiment, the restart button 1312 is located inline with the bezel 1358. The restart button 1312 can be shaped to follow the contour and shape of the bezel 1358 so as to remain unobtrusive. The primary switching element 1302 can extend past the bezel 1358 so that the restart button 1312 is not inadvertently pressed.

The restore button 1310 and restart button 1312 can each be located on an accessible surface (e.g., the room-facing side 1320) of the network device when the network device is recessed in a structure (e.g., mounted in a wall or in an electrical box).

The network device 1300 further includes electric terminals 1308, here depicted as wires extending from the back of the network device 1300 and coupled to the wall-facing side 1322, for connection to line power, for providing electrical power to the network device 1300, and for providing switchable electrical power to an electrical device. In some embodiments, a variety of electric terminals are useful, including electrical wires, screw terminals, barrier terminals, push-in terminals and the like. Various electrical codes may dictate which electric terminal types are required or permitted for the network device 1300. The electric terminals 1308 allow the network device 1300 to be connected to line power providing 200V, 120V, or the like. In turn, an electrical device, such as an outlet, socket, light fixture or appliance, may be connected to the network device 1300. Once the network device 1300 is registered according to the techniques described above, a power state or other controllable aspects of the electrical device connected to the network device 1300 may be controlled by a user using an access device (e.g., access device 108).

The network device 1300 includes a housing configured to be installed in an electrical box, similar to the placement of conventional light switches and electrical outlets. Mounting apertures 1314 are included for attaching the network device 1300 to an electrical box, such as an electrical box located inside a wall. Cover plate holes 1316 are included for attaching a wall plate over the network device 1300, similar to the attachment of a switch/wall plate over a conventional light switch or electrical outlet. The front view of the network device 1300 in the left panel of FIG. 13 shows the room-facing side 1320 of network device 1300. The room-facing side 1320 of the network device 1300 and the wall-facing side 1322 of the network device 1300 are both shown in the right panel of FIG. 13.

In one instance, a power display 1340 can be illuminated to indicate that the network device 1300 is providing power to the electrical device and can be turned off to indicate no power is being provided to the electrical device. The power display 1340 can comprise a light source located on a circuit board under the primary switching element 1302, and can optionally include one or more of a light pipe 1342, a mask 1344, and a lens 1346.

The light pipe 1342 can be used to keep excess light from spilling in undesired directions. The light pipe 1342 can be a hollow piece of black plastic, a fiber optic tube, or any other suitable structure. The mask 1344 can block portions of the light source in order to create a pattern. For example, the mask 1344 of a power display 1340 can be shaped to give the light a user-recognizable power button shape. The mask 1344 can be incorporated into the lens 1346. The lens 1346, with or without a mask 1344, can be incorporated into room-facing side 1320, such as the primary switching element 1302.

The network device 1300 can include a network status display 1348 that provides information about the status of the network device's 1300 network connectivity, such as wireless connectivity and signal strength. The network status display 1348 can include a light source, a light pipe 1350, and a mask 1352. The mask 1352 can provide a shape to the light, such as the shape of concentric arcs gradually increasing in size, signifying radiating radio waves. Without a lens or other opening, the light from the network status display 1348 can pass through translucent material of the room-facing side 1320, such as the primary switching element 1302. The light source may depict different colors or other characteristics (e.g., flashing, dimming, or the like) to indicate different levels of signal strength or mode of operation.

The network device 1300 can include a nightlight display 1354. The nightlight 1354 can be illuminated whenever the electrical device is turned off or whenever the electrical device is turned off and the ambient light is below a preset level. The nightlight display 1354 can include a light source and a light pipe 1356. In some embodiments, the nightlight 1354 may not have a light pipe 1356, and can illuminate a larger portion of the room-facing side 1320, such as a larger portion of the primary switching element 1302.

Because the various displays (e.g., power display 1340, network status display 1348, nightlight display 1354, and others) can be located anywhere on the room-facing side 1320, the displays can be located on the primary switching element 1302 (e.g., as shown in FIG. 13), inline with a bezel 1358, through a cover, or elsewhere visible to a user when the network device 1300 is installed. In some embodiments, each display can include one or more light sources capable of providing one or more colors of light (e.g., a bicolor LED).

Figure 14:
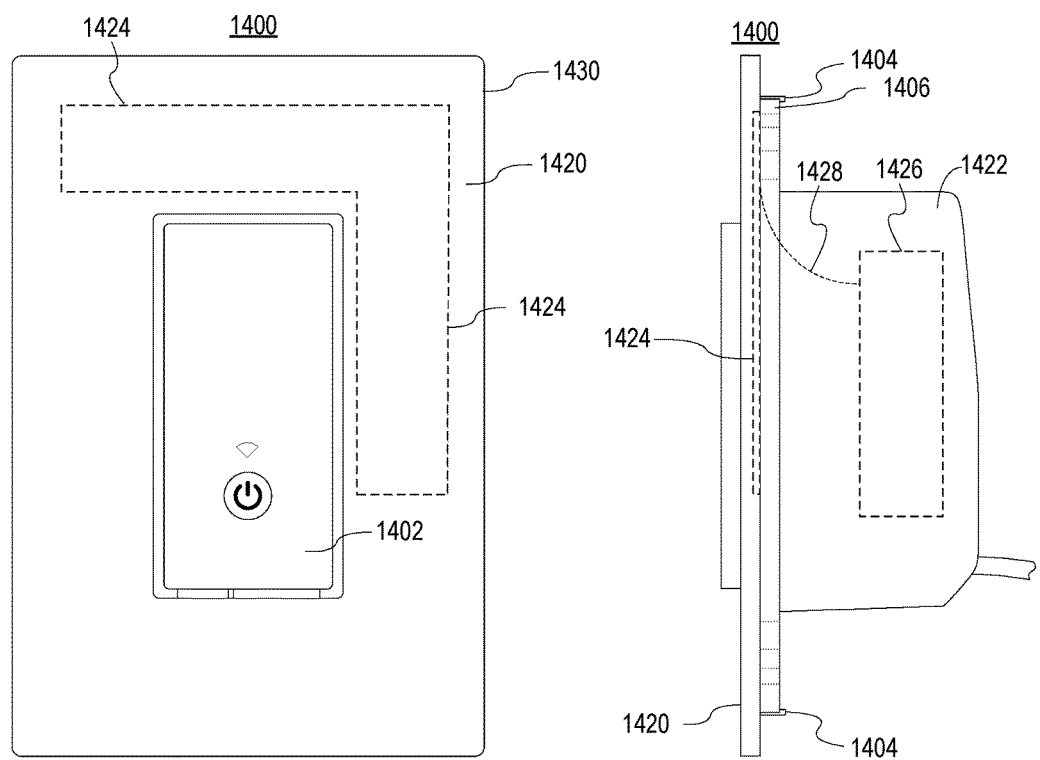
FIG. 14 is an illustration of an example of front and side views of a network device, in accordance with an embodiment.

FIG. 14 illustrates example views of a network device 1400, with the left panel showing a front view and the right panel showing a side view. The network device 1400 may include any of the network devices 102, 104, or 106 described herein. The network device 1400 includes a primary switching element 1402, a room-facing side 1420, a wall-facing side 1422 and a circuit board 1426. Network device 1400 may be similar or identical to network device 1300, and may include a cover plate 1430. The cover plate 1430 may include clips 1404 for securing the cover plate 1430 to a support plate 1406 of the network device 1400. The clips 1404 allow the cover plate 1430 to be secured to the support plate 1406 without the need to use a screw or other fastener through apertures in the cover plate, thus creating a clean front. Flexure of the cover plate 1430 allows clips 1404 to bend far enough to pass over the bottom and/or top of the support plate 1406 to remove and attach the cover plate 1430 to the support plate 1406. In some embodiments, the cover plate 1430 may be secured to the support plate 1406 through other means of attachment besides clips 1404, such as adhesive, velcro, nails, screws, magnets, suction cups, and the like.

Inclusion of the cover plate 1430 provides for the ability to include a circuit board 1424 within the cover plate 1430. The circuit board 1424 located within the cover plate 1430 may communicate with the circuit board 1426 located within the housing of the network device 1400 via a wired connection 1428 or via a wireless connection. In some embodiments, the circuit board 1424 located within the cover plate 1430 may include a wireless antenna such that when network device 1400 is mounted in an electrical box in a wall, the wireless antenna is not placed within the wall or within the electrical box, but is located outside the wall or electrical box, minimizing or reducing wireless signal interference and/or signal degradation due to the electrical box, the wall, and associated building materials. In addition, placing a wireless antenna at an external location eliminates the requirement to include a wireless antenna directly on the circuit boards 1424 and 1426, providing additional space for inclusion of other components. Furthermore, the circuit board 1424 within the cover plate 1430 allows for inclusion of a wide number of sensors, input devices, and output devices in the network device 1400, such as temperature sensors, light sensors, humidity sensors, proximity sensors, touch sensors, audio sensors, chemical sensors ($CO$, $CO_2$, $CH_4$, etc.), motion sensors, power switching, speakers, cameras, LEDs, biometric sensors, push buttons, display devices, and the like.

Figure 15A:
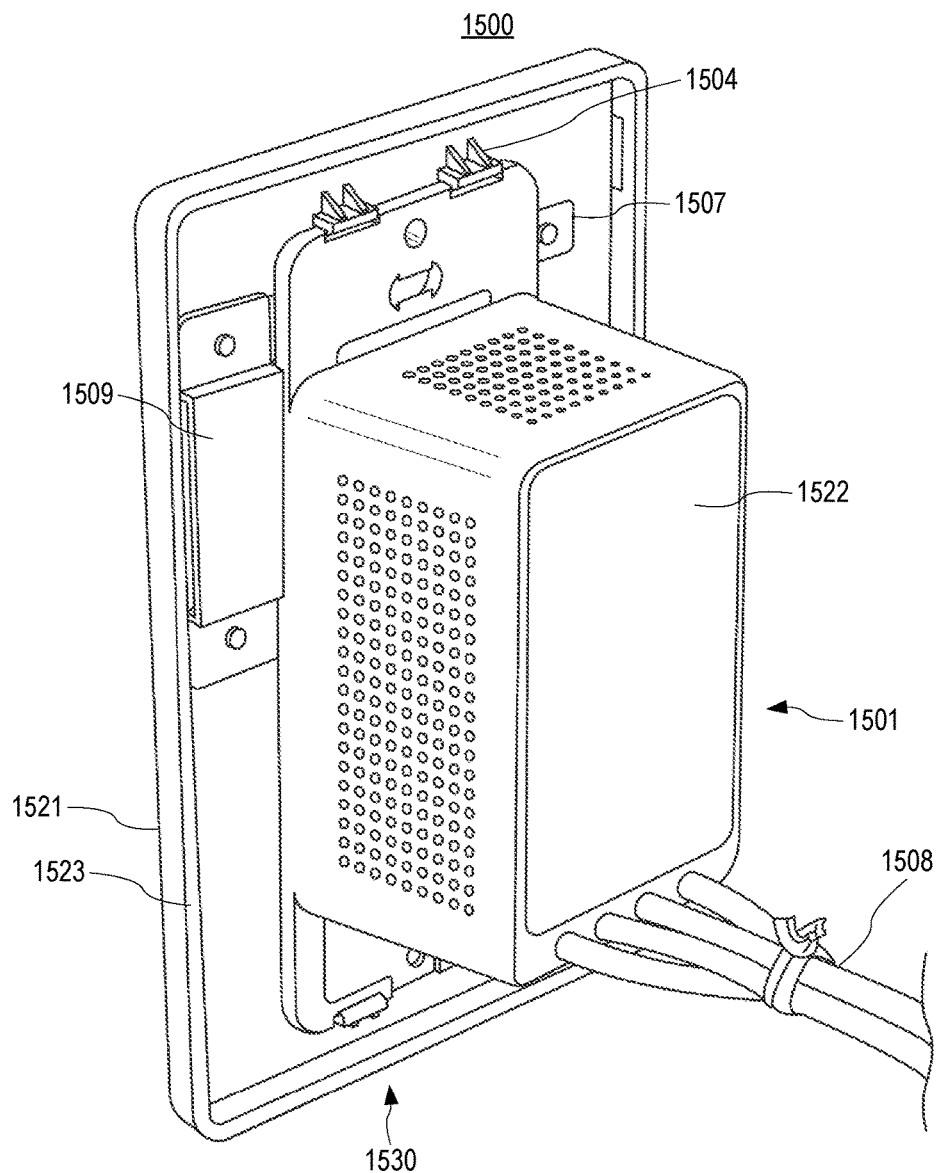
FIG. 15A and FIG. 15B are illustrations of perspective views of a network device, in accordance with an embodiment.
Figure 15B:
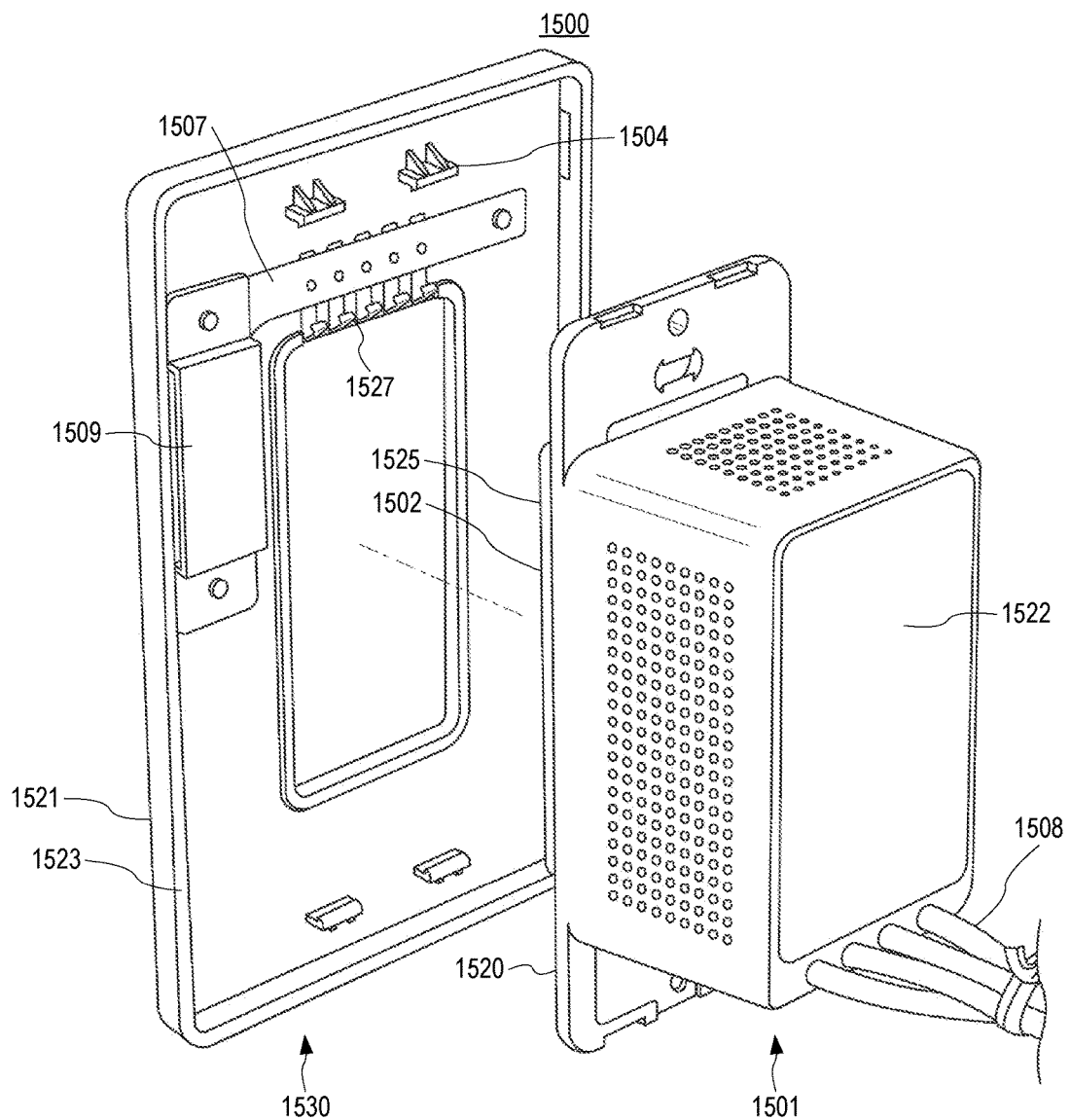

FIGS. 15A-15B illustrate perspective views of a network device 1500, with FIG. 15A showing an assembled view and FIG. 15B showing a partially exploded view. The network device 1500 may include any of the network devices 102, 104, or 106 described herein. The network device 1500 may include a cover plate 1530 that is attachable to a housing 1501. The cover plate 1530 may include a room-facing side 1521, a wall-facing side 1523, and a cover circuit board 1507, among other components. The housing 1501 may include a wall-facing side 1522, a room-facing side 1520, electric terminals 1508 for connection to the line power, a housing circuit board (contained within the housing 1501), and primary switching element 1502, among other components.

The network device 1500 may have similar and/or additional features as those described in reference to FIG. 13 and FIG. 14. For example, one or more of the components located within the circuit boards of network devices 1300 and 1400 may be relocated to the cover circuit board 1507. Relocating certain circuit components, such as a wireless antenna, to the cover circuit board 1507 may have advantages due to the location of the cover plate 1530 outside of the wall in which the network device 1500 is mounted. Other circuit components, such as sensors and displays, may be advantageous to include in the cover circuit board 1507 due to the accessibility of the cover plate 1530 by a user. Furthermore, some circuit components may be included in the cover circuit board 1507 due to its modular nature. For example, because the cover plate 1530 may be replaced more easily than the housing 1501, circuit components that involve quickly evolving technologies may be included in the cover circuit board 1507, and circuit components that involve slowly evolving technologies that need not be replaced as frequently, such as DC power supplies, may be included in the housing circuit board.

The cover circuit board 1507 located within the cover plate 1530 provides additional spatial area for including additional components, such as wireless antennas, switches, touch screen interfaces and the like. For example, in some embodiments, a wireless antenna may be mounted on the room-facing side 1521 of the cover plate 1530. The cover circuit board 1507 may further include components such as a data processor and wireless transceiver to improve the functionality of the wireless antenna. A transmission line may connect the wireless antenna to the wireless transceiver on the cover circuit board 1507 or on the housing circuit board. In some embodiments, the transmission line may comprise a coaxial cable, providing an electrically shielded radio frequency transmission line between the wireless antenna and the wireless transceiver. When the network device 1500 is mounted in an electrical box placed in a wall, the wireless antenna may be positioned at least partially in front of a plane defined by the room-facing surface of the wall. This configuration provides the network device 1500 with the capability of reducing or minimizing interference for wireless transmissions between a wireless antenna to a wireless access point, gateway or other wireless device due to the wall, electrical box or associated building materials.

The cover circuit board 1507 may be electrically coupled with the housing circuit board and the electric terminals 1508 via cover contact elements 1527 and housing contact elements 1525 (not visible in FIG. 15 due to perspective). When the cover plate 1530 is attached to the housing 1501 (using clips 1504 or another means of attachment), the cover contact elements 1527 may physically contact the housing contact elements 1525. Because both sets of contact elements are conductors, this provides an electrical connection between the cover circuit board 1507 and the housing circuit board, allowing electronic communication between the devices. In some embodiments, either one or both of the cover contact elements 1527 and the housing contact elements 1525 comprise a set of metal prongs that are bent in one or two locations to provide constant physical contact. The contact elements may also comprise pressure pins (or Pogo pins) as opposed to traditional connectors. The metal prongs shown in FIG. 15B have the advantage of dealing with potential irregularities in wall surface flatness that would interfere with proper mating of connectors. Although the network device 1500 is shown with the cover contact elements 1527 comprising 5 metal prongs, the number of contact elements may be greater or less than this.

In some embodiments, the network device 1500 may include clips 1504 for securing the cover plate 1530 to the housing 1501. The clips 1504 may have similar and/or additional features as those discussed in reference to the clips 1404 of network device 1400. In some embodiments, the network device 1500 includes a protective plate 1509 that may cover a portion or all of the cover circuit board 1507. The protective plate 1509 may be a conductive material for reducing electromagnetic interference to the cover circuit board 1507. The protective plate 1509 may be grounded or may be a floating conductor. In some embodiments, the protective plate 1509 may protect the cover circuit board 1507 from damage when the cover plate 1530 is being attached or removed from the housing 1501.

Figure 15C:
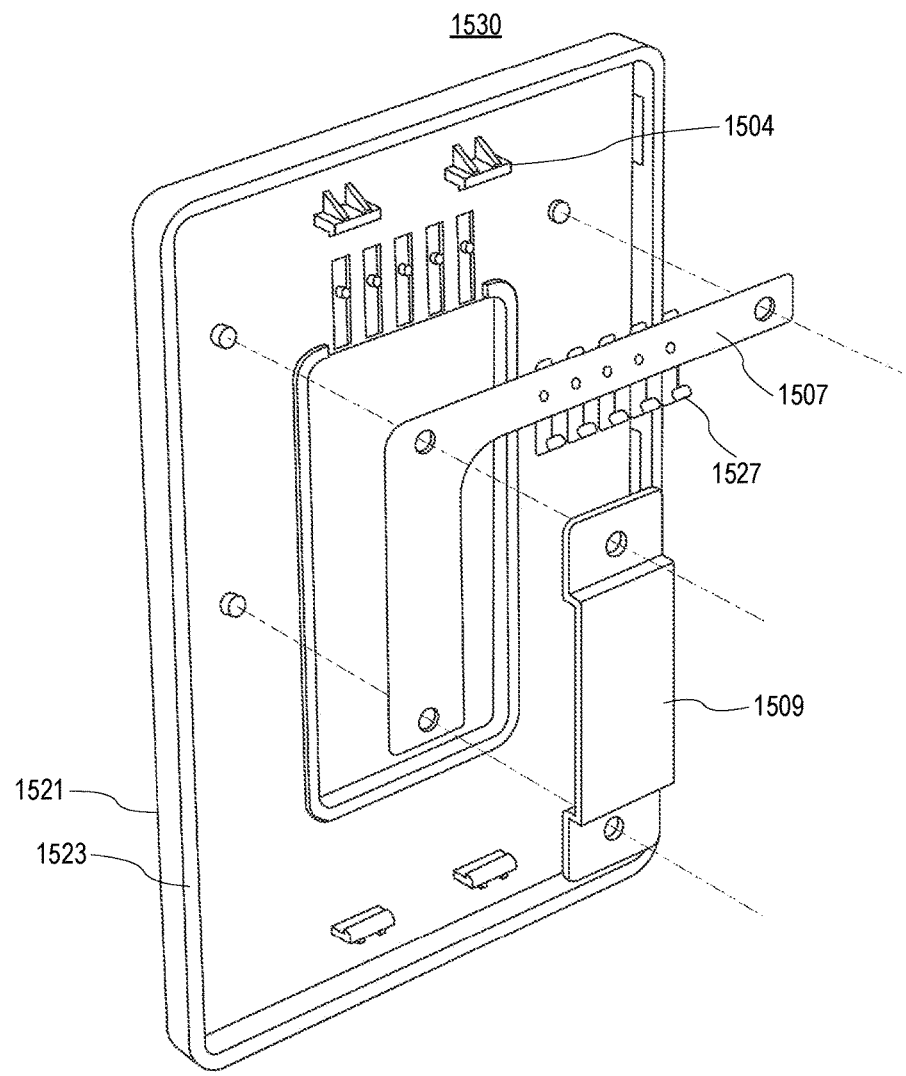
FIG. 15C is an illustration of a perspective view of a cover plate, in accordance with an embodiment.

FIG. 15C illustrates an exploded, perspective view of a cover plate 1530, in accordance with an embodiment. The cover plate 1530 may have similar and/or additional features as those described herein in reference to cover plate 1430. For example, the cover plate 1530 may include a cover circuit board 1507, a protective plate 1509, cover contact elements 1527, and clips 1504.

Figure 15D:
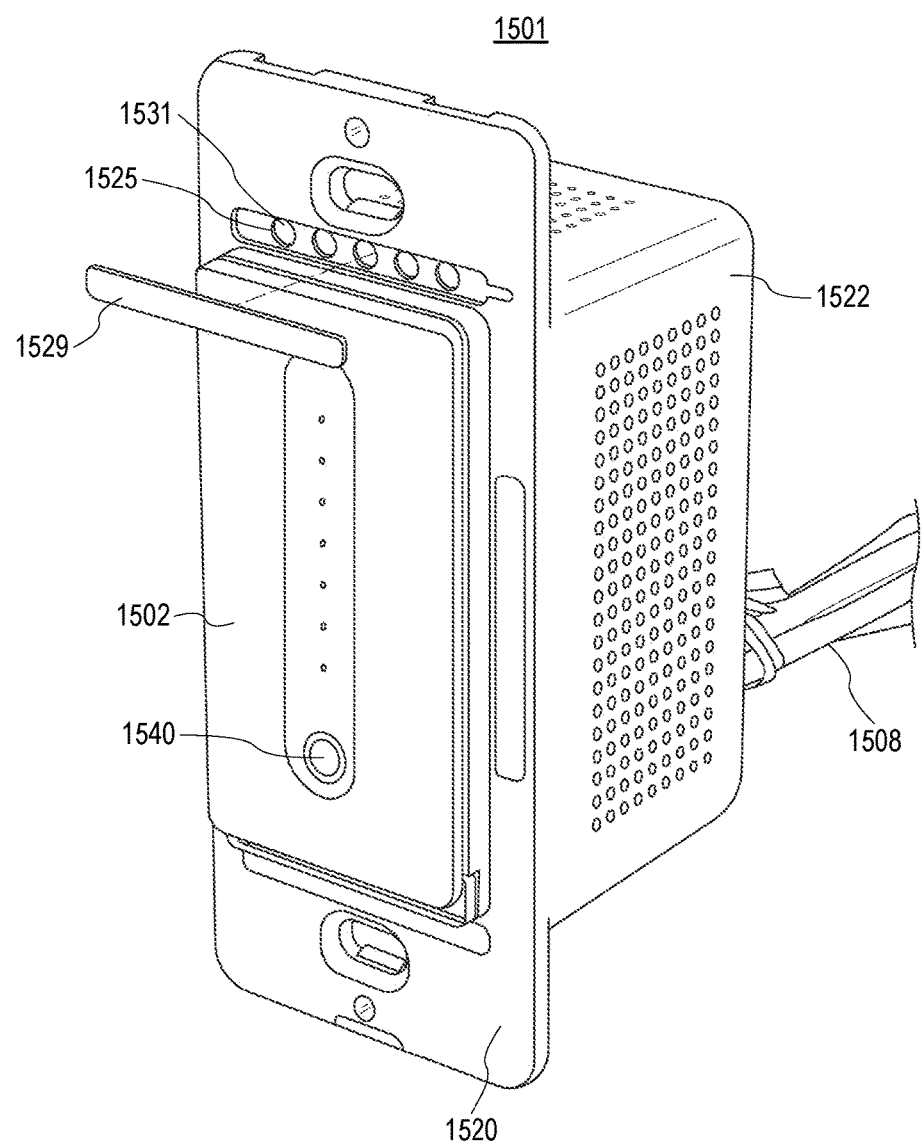
FIG. 15D is an illustration of an example of a perspective view of a housing, in accordance with an embodiment.

FIG. 15D illustrates a perspective view of a housing 1501, in accordance with an embodiment. The housing 1501 may have similar and/or additional features as those described herein in reference to housings. For example, the housing 1501 may include a power display 1540, a primary switching element 1502, electric terminals 1508, housing contact elements 1525, and apertures 1531. Although primary switching element 1502 is shown as a touch-sensitive dimmer switch, it may be configured in similar and/or additional ways as those described in reference to primary switching elements 1302 and 1402. As shown, the primary switching element may include a series of electric lights arranged vertically that indicate a current power state of a remote electrical device, such as the power level of a dimmed light. Additionally, the housing 1501 may include a covering 1529 that may be placed over the housing contact elements 1525 when a cover plate with enclosed circuitry is not being used. In some embodiments, use of the covering 1529 may allow the housing 1501 to be aesthetically pleasing without attaching any cover plate. Covering 1529 may also serve to protect housing contact elements 1525 when no cover plate is installed or metal prongs or other electrical connectors are positioned in contact with contact elements 1525.

Figure 16:
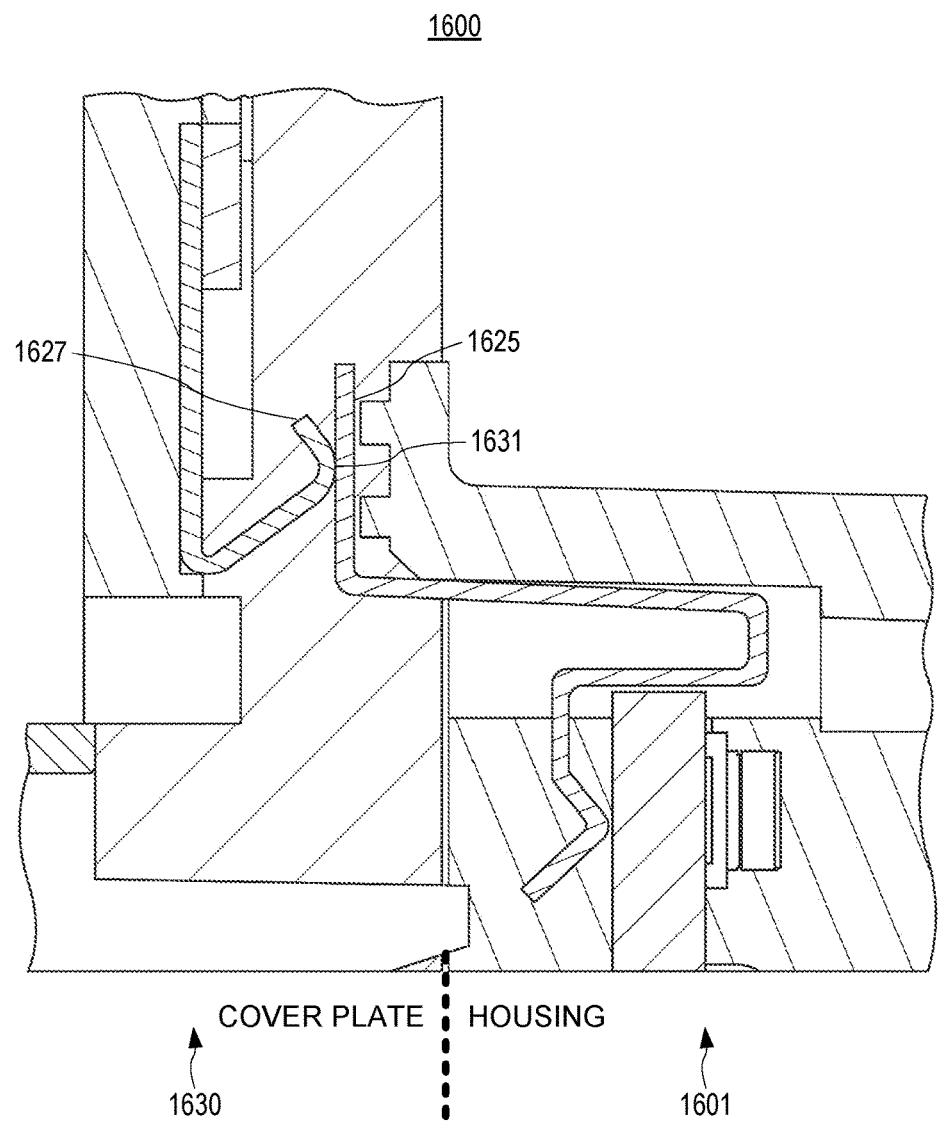
FIG. 16 is an illustration of an example of a side view of a network device, in accordance with an embodiment.

FIG. 16 illustrates a side view of a network device 1600 showing one technique in which cover contact elements 1627 of cover plate 1630 may come in physical contact with housing contact elements 1625 of housing 1601. The cover contact elements 1625 may comprise a set of metal prongs bent at an angle greater or less than 90 degrees. This may allow the metal prongs to be flexible and remain in constant physical contact with the housing contact elements 1625, which are shown in FIG. 16 as flat metal prongs with apertures 1631 for receiving the cover contact elements 1627. In some embodiments, the configurations of the contact elements may be reversed, with the housing contact elements 1625 comprising a set of metal prongs bent at an angle greater or less than 90 degrees and the cover contact elements 1627 comprising a set of flat metal prongs with apertures.

Figure 17:
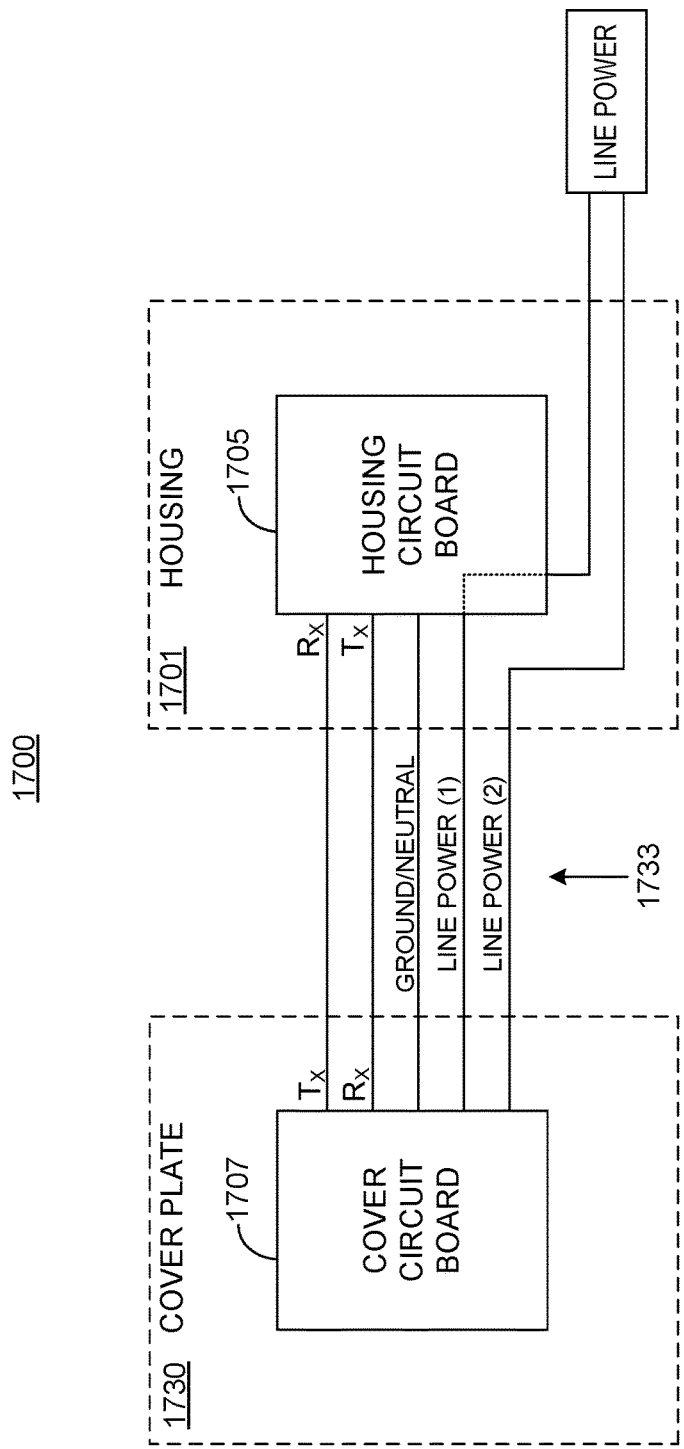
FIG. 17 is an example of a block diagram of a network device, in accordance with an embodiment.

FIG. 17 is an example of a block diagram of a network device 1700 depicting components and relating to a method of communication of the network device 1700. In some embodiments, a cover circuit board 1707 within a cover plate 1730 and a housing circuit board 1705 within a housing 1701 include UART devices for device-to-device communication. Information may be sent between the circuit boards using buses 1733 formed by the cover contact elements being in physical contact with the housing contact elements, as described herein.

In some embodiments, the buses 1733 comprise 5 separate buses for communication. A first bus may be used for transmitting data ($T_x$) by the cover circuit board 1707 and receiving data ($R_x$) by the housing circuit board 1705. A second bus may be used for receiving data ($R_x$) by the cover circuit board 1707 and transmitting data ($T_x$) by the housing circuit board 1705. A third bus may be used as a ground and/or neutral signal. A fourth bus may be used as a power signal. The power signal may be received by the cover circuit board either directly from a line power source or through the housing circuit board 1705. One advantage of receiving the line power signal through the housing circuit board is that only a single AC/DC power supply may be needed. In some embodiments, electrically coupling with a line power source may be direct or indirect. Direct electrically coupling with a line power may include direct access to AC voltage provided by the line power, which may be 120V or 220V at 60 Hz, or may include direct access to DC voltage provided by the line power, with no intervening circuit elements. An indirect electrically coupling with a line power may include access to an AC voltage signal that is separated from the line power by one or more circuit elements (e.g., resistors, capacitors, inductors, transformers, etc.), or may include access to a DC voltage signal that is separated from the line power by one or more circuit elements (e.g., power supplies, AC/DC converters, resistors, capacitors, inductors, etc.). Although the line power is generally regarded as an AC electrical power source such as a mains power supply, in some embodiments, the line power may include AC or DC power from an electrical generator, DC power from a battery, and the like.

In some embodiments, the buses 1733 may comprise a fewer number of individual buses than 4 or 5. For example, a certain bus in some embodiments may exclusively perform a single function, such as transferring data in one direction, but in other embodiments the bus may combine different functions. For example, where the communication between the circuit boards is half duplex, devices may take turns between transmitting and receiving data. In full duplex communication, the first and second buses may be combined into a single bus. Furthermore, in some embodiments, a power signal may not be needed where the cover circuit board 1707 has an alternative power source, such as a battery power or solar power. In addition, some communication methods may not require use of a ground and/or neutral signal.

In some embodiments, a processor within the cover circuit board 1707 may be configured to receive an input signal related to a sensor reading from a sensor located within the cover plate 1730. Obtaining the sensor reading may be triggered by input and may be related to the control of a power state of a remote electrical device, such as a light bulb. The processor may further be configured to transmit a wireless signal to control the state of the remote electrical device. The state of the remote electrical device may include a power state (such as "on", "off", or "50% power"), a physical position state (such as "window blinds lowered 50%", "window blinds rotated 75%", "TV stand raised 100%", "door lock in unlocked position"), and the like.

Figure 18A:
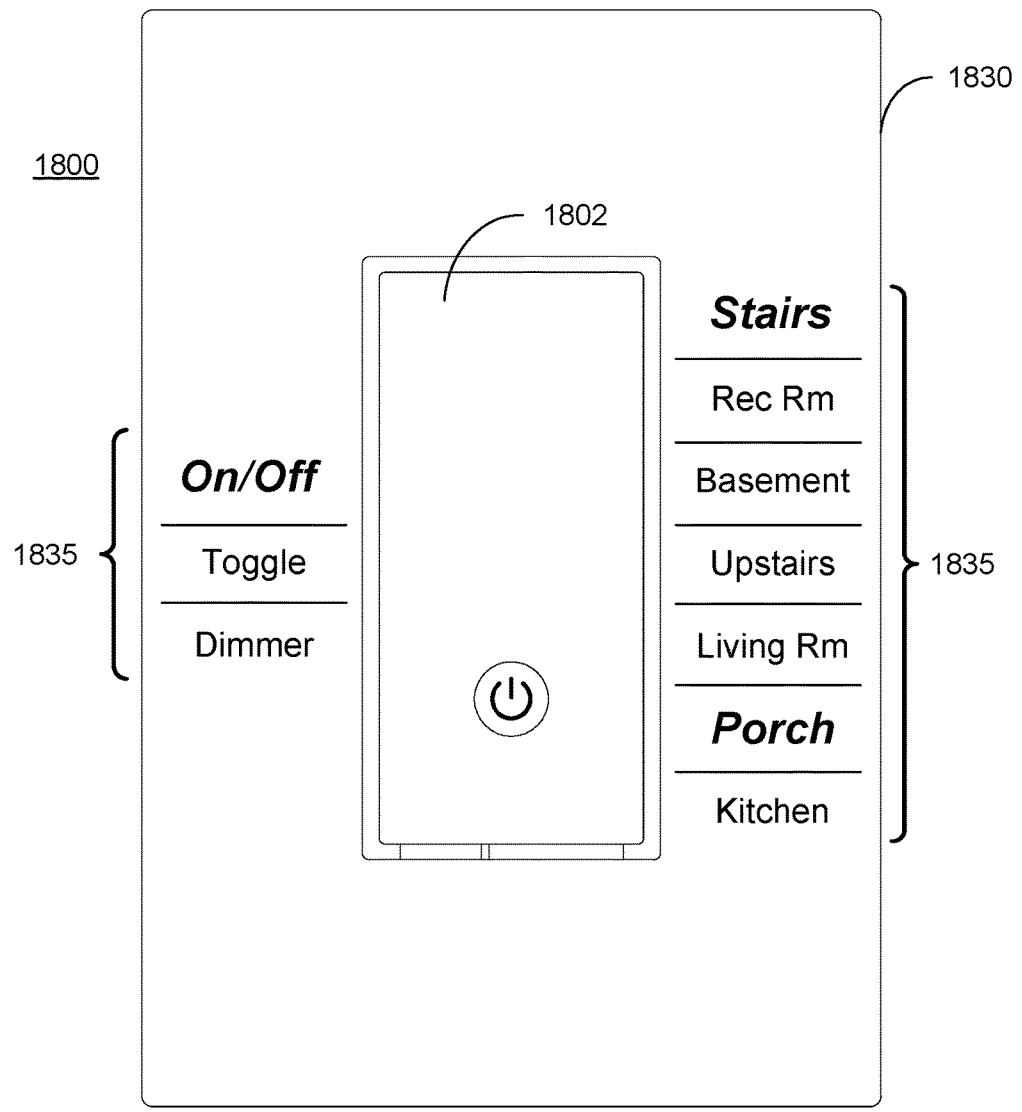
FIG. 18A, FIG. 18B, FIG. 18C, and FIG. 18D are illustrations of an example of front views of a network device, in accordance with an embodiment.
Figure 18B:
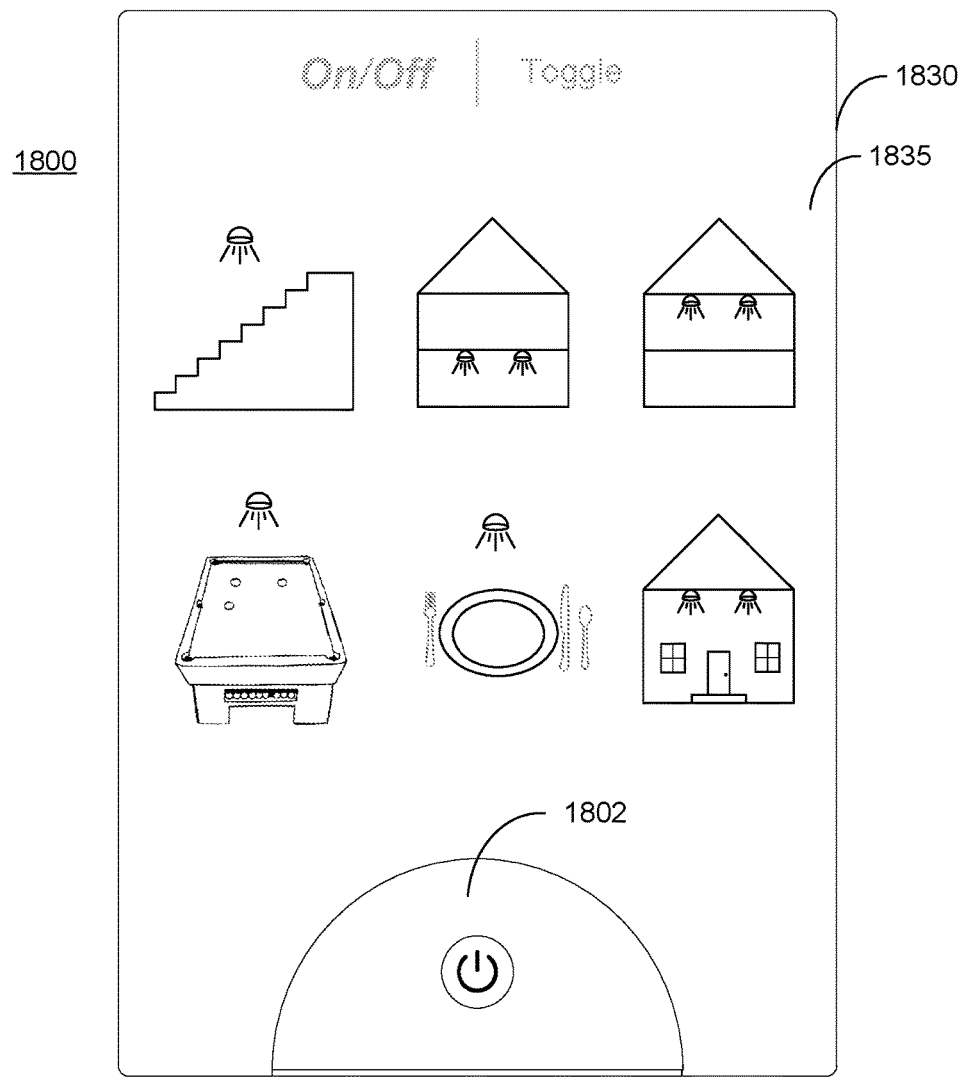
Figure 18C:
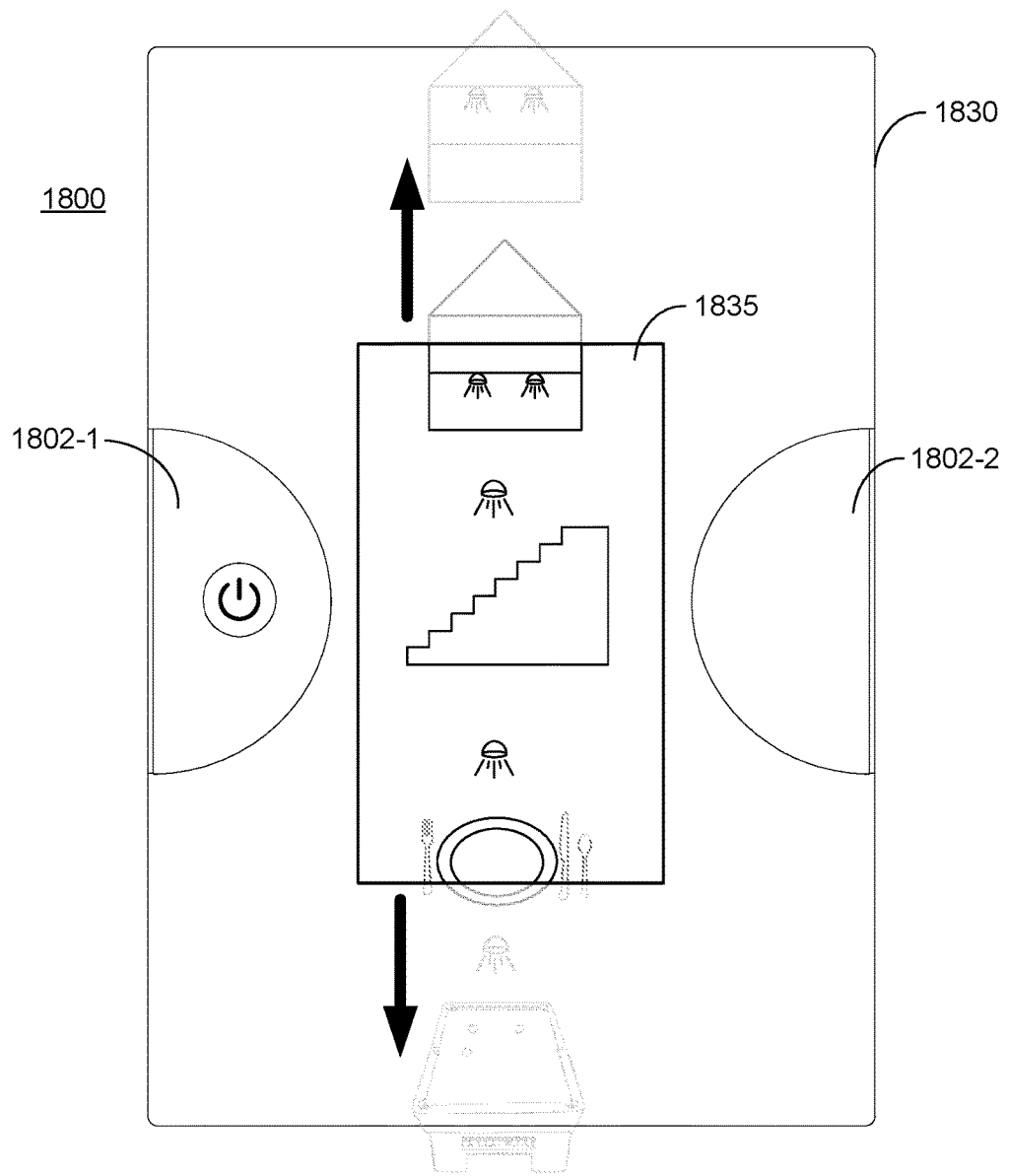
Figure 18D:
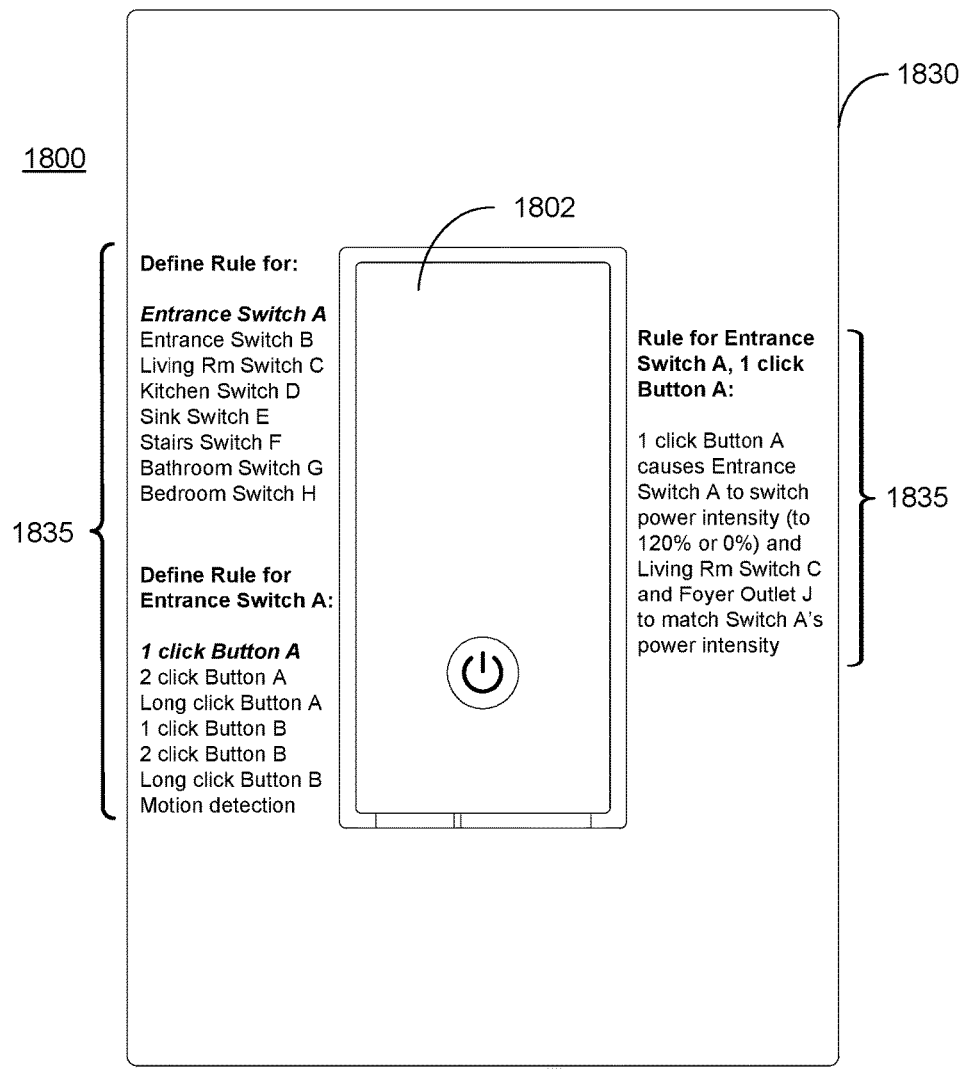

FIGS. 18A-18D illustrate front views of a network device 1800 with visual interfaces. In some embodiments, the network device 1800 includes a touch screen 1835 on the cover plate 1830 that allows users to interact with the device using one or more virtual options or buttons. The touch screen 1835 may be partitioned into two or more different regions as shown in FIGS. 18A and 18D. In the depicted scenario of FIG. 18A, the touch screen 1835 includes seven location options on the right side and three button options on the left side. In this instance, each location option corresponds to a home location, and each button option corresponds to a function of the primary switching element 1802.

For example, in some embodiments, a user may first select a group of remote electrical devices throughout a house using the right side of the touch screen 1835, such as the "stairs" option and the "porch" option. Second, the user may select how the primary switching element 1802 modifies the power state of the selected remote electrical devices, such as the "on/off" option which may cause all the remote electrical devices to switch "on" or "off" in unison, regardless of whether their previous state was "on" or "off". By way of another example, where the "toggle" option is selected, each press of the primary switching element 1802 may cause the selected remote electrical devices to switch to "on" if they were previously "off" and to switch to "off" if they were previously "on". By way of another example, where the "dimmer" option is selected, the primary switching element 1802 may become sensitive to the location at which the user presses it, allowing the power state of the remote electrical devices to be modified according to the typical functionality of dimmer switches.

The "toggle" option may be implemented using one of several methods. In one method, when the primary switching element 1802 is pressed, an interrogation signal may be transmitted wirelessly to determine the current power states of the selected remote electrical devices. After a response signal is received indicating the current power states, an instruction signal may be transmitted to toggle the current power states. For example, if a response signal indicates that a remote electrical device is "off", then an instruction signal may be transmitted to modify the power state to "on". Conversely, if a response signal indicates that a remote electrical device is "off", then an instruction signal may be transmitted to modify the power state to "on". The instruction signal may include a series of instructions that when received by a processor within the remote electrical device cause the processor to modify the state of the remote electrical device accordingly. For example, an incandescent or LED light bulb with an embedded processor and antenna may receive an instruction signal from the network device 1800 that includes instructions to remove voltage and/or current from the wire filament or anode/cathode.

In another method for implementing the "toggle" option, particularly in situations where the remote electrical device may be more sophisticated, a wireless signal is simply transmitted with instructions for a remote electrical device to toggle its current power state. The remote electrical device then determines its current power state and toggles it either from "off" to "on" or from "on" to "off". For example, an incandescent or LED light bulb with an embedded processor and antenna may receive an instruction signal from the network device 1800 that includes instructions to toggle its current power state. The light bulb may determine that it is currently delivering voltage and/or current to the wire filament or anode/cathode, and in response to that determination it may remove voltage and/or current.

In some embodiments, use of the primary switching element 1802 may not be needed to modify a power state of a remote electrical device. For example, the touch screen 1835 may enable a user to modify a power state of a remote electrical device by allowing a user to simply press one of the location options on the right side. The power state may be modified immediately upon the user pressing one of the location options, or it may be modified after the user presses both a location option and a button option. Furthermore, a virtual dimmer switch may be displayed on the touch screen 1835 to enable a user to more precisely modify a power state of a remote electrical device.

In reference to FIG. 18B, the network device 1800 may include a primary switching element 1802 situated along a side of the cover plate 1830. The touch screen 1835 may include graphical icons for the location options and/or the button options.

In reference to FIG. 18C, the network device 1800 may include multiple primary switching elements 1802 performing different functions such as selecting, toggling, and scrolling. The touch screen 1835 may be scrollable by a user in the vertical and/or horizontal direction, allowing a wide range of remote electrical devices to be accessible. In some embodiments, scrolling in a vertical direction may move through different levels of a house, and scrolling in a horizontal direction may move through different remote electrical devices on the current level.

In reference to FIG. 18D, the network device 1800 may include a touch screen 1835 for receiving user input to define a rule. The functionality of the network device 1800 to create different rules may be similar to those described herein, particularly in reference to FIGS. 12A-12F. Rules may be defined in terms of user inputs and sensor readings, as well as other factors.

Figure 19:
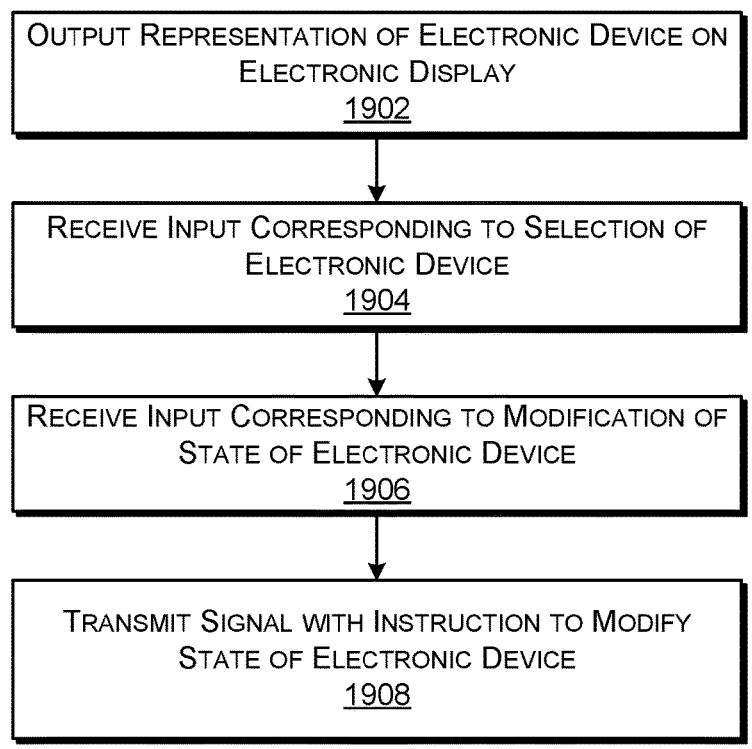
FIG. 19 is a flowchart illustrating an embodiment of a process for modifying a state of a remote electrical device, in accordance with an embodiment.

FIG. 19 illustrates an example of a process 1900 for modifying a state of a remote electrical device. Process 1900 may be implemented by any of the network devices described herein. In some embodiments, the operations of process 1900 may be performed by a processor located within a network device. The processor may be located within a cover plate, a housing, or another location.

At step 1902, a network device may output a representation of an electronic device on an electronic display. The representation of the electronic device may be displayed alongside multiple other representations of other electronic devices, or may be displayed alone. The electronic device may be associated with a state, such as a power state or a physical position state. At step 1904, the network device may receive input corresponding to a selection of the electronic device. At step 1906, the network device may receive input corresponding to a modification of the state of the electronic device. The input corresponding to the selection of the electronic device and the input corresponding to the modification of the state of the electronic device may be received simultaneously or separately.

At step 1908, the network device may transmit a signal corresponding to an instruction, such as an instruction to modify the state of the electronic device. When received at the electronic device, the instruction may cause the electronic device to modify the state according to the instruction. In some embodiments, the network device may transmit an interrogation signal to determine a current state of the electronic device, receive a response signal indicating the current state of the electronic device, and output the current state of the electronic device on the electronic display. In some embodiments, step 1908 may include transmitting an instruction signal to toggle the current power state of the electronic device.

Figure 20:
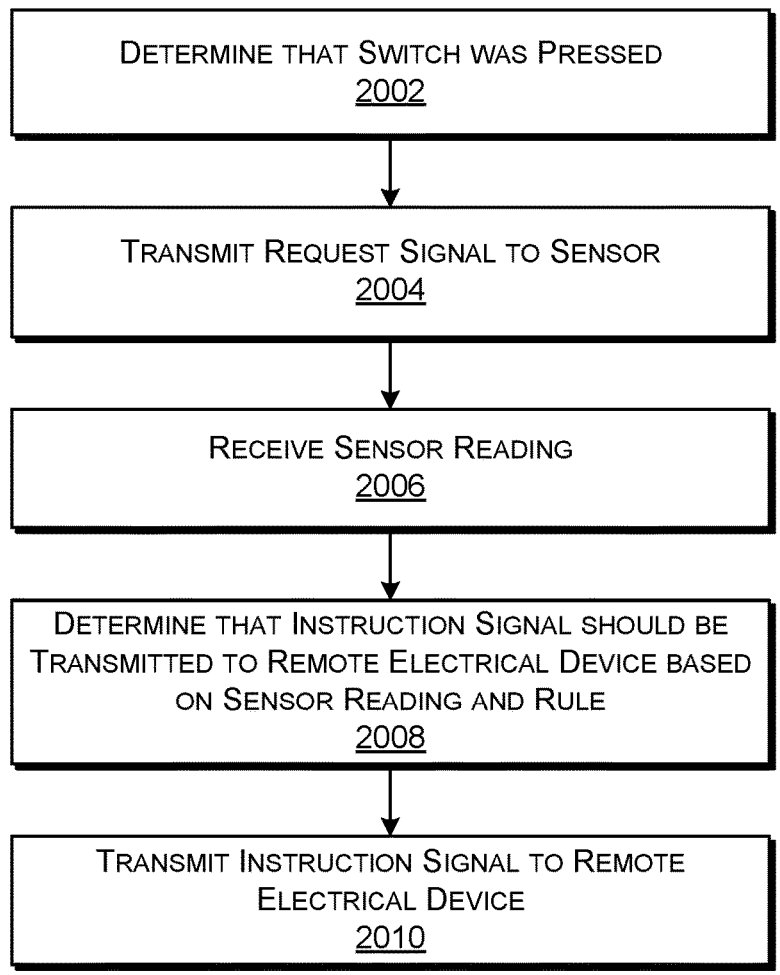
FIG. 20 is a flowchart illustrating an embodiment of a process for modifying a state of a remote electrical device, in accordance with an embodiment.

FIG. 20 illustrates an example of a process 2000 for modifying a state of a remote electrical device. Process 2000 may be implemented by any of the network devices described herein. In some embodiments, the operations of process 2000 may be performed by a processor located within a network device. The processor may be located within a cover plate, a housing, or another location.

At step 2002, a network device may determine that a primary switching element has been pressed. In some embodiments, the primary switching element may transmit a signal to the network device each time it is pressed. In some embodiments, the network device may transmit a signal to the primary switching element to inquire whether or not the primary switching element has been pressed. In some embodiments, step 2002 may comprise the network device determining that a touch screen button has been pressed, instead of the primary switching element. The touch screen button may be located on the cover plate as described in reference to FIG. 18A.

At step 2004, the network device may transmit a signal to a sensor. The sensor may be located within the network device on the room-facing side therein, or may be located external to the network device. The network device (or processor therein) and the sensor may communicate via wireless or wired electronic communication. In some embodiments, step 2004 is performed only after step 2002 is performed, such that the network device only requests a sensor reading when a user presses the primary switching element. In some embodiments, step 2004 is entirely omitted, particularly when the type of sensor being used does not necessarily transmit a signal but rather is constantly electrically coupled with a processor. Optionally, sensor readings may be automatically transmitted without being requested, such as periodically or aperiodically.

At step 2006, the network device may receive the sensor reading. In some embodiments, the network device may not directly receive the sensor reading, but may receive a signal that is related to or derived from the sensor reading. For example, the sensor reading may be filtered or digitized prior to receipt by the network device. The sensor reading may comprise a scalar value or, in some embodiments, may comprise a more complex data structure. For example, the sensor reading may be generated by a temperature sensor, light sensor, humidity sensor, proximity sensor, touch sensor, motion sensor, camera, biometric sensor, push button, and the like.

At step 2008, the network device determines whether or not an instruction signal should be transmitted to a remote electrical device based on the sensor reading and a rule. As described herein, particularly in reference to FIGS. 12A-12F and 18B, a rule may be defined. The rule may dictate a type of stimulus that may serve as a trigger for a subsequent action. For example, the subsequent action may be the transmission of an instruction signal to a remote electrical device. Examples of rules used in process 2000 may include any of the following: "IF temperature>70 degrees THEN send instruction signal", "IF temperature>70 degrees AND button was pressed THEN send instruction signal", and "IF button was pressed THEN send instruction signal". Therefore, the determination that the instruction signal should be transmitted may be based on a sensor reading and a rule. In some embodiments, the determination may also be based on whether a button was pressed. Alternatively, the determination may be based solely on whether a button was pressed, ignoring the sensor reading.

At step 2010, the network device transmits an instruction signal, such as an instruction signal to modify the power state of the remote electrical device when it is determined that the instruction signal should be transmitted. As discussed in reference to FIG. 18A, the instruction signal may comprise instructions to cause the remote electrical device to be powered on, powered off, or may cause the current power state of the remote electrical device to toggle from either "off" to "on" or from "on" to "off". The instruction signal may be sent wirelessly or through a wired connection.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

INCORPORATION BY REFERENCE

The following applications are hereby incorporated by reference in their entireties for all purposes: U.S. Non-provisional application Ser. No. 14/750,786, filed on Jun. 25, 2015, U.S. Non-provisional application Ser. No. 15/019,525, filed on Feb. 9, 2016, U.S. Non-provisional application Ser. No. 15/019,538, filed on Feb. 9, 2016, U.S. Provisional Application No. 62/087,647, filed on Dec. 4, 2014, U.S. Provisional Application No. 62/087,743, filed on Dec. 4, 2014, U.S. Provisional Application No. 62/024,902, filed on Jul. 15, 2014, U.S. Provisional Application No. 62/020,852, filed on Jul. 3, 2014, U.S. Provisional Application No. 62/018,171, filed on Jun. 27, 2014.

What is claimed is:

1. A network device comprising:
a housing configured to be mounted into a wall, wherein the housing includes a room-facing side and a wall-facing side, wherein the housing includes electrical connections for coupling with a line power, and wherein the housing includes a set of housing electrical contact elements located on the room-facing side of the housing; and
a cover including a room-facing surface and a wall-facing surface, wherein the wall-facing surface of the cover is configured to be removably attached to the room-facing side of the housing, wherein the cover includes a set of cover electrical contact elements located on the wall-facing surface of the cover, and wherein the cover includes a cover circuitry configured to receive an input signal;
wherein the cover is attachable to the housing;
wherein the cover circuitry is electrically coupled with e set of cover electrical contact elements;
wherein the set of housing electrical contact elements are electrically coupleable with the set of cover electrical contact elements;
wherein one or more elements on the room-facing side of the housing are physically accessible through an opening defined by the cover.

2. The network device of claim 1, wherein the cover circuitry is electrically coupled with the line power via the set of housing electrical contact elements and the set of cover electrical contact elements.

3. The network device of claim 1, further comprising:
an antenna located within the cover circuitry for communicating with an electrical device.

4. The network device of claim 1, further comprising a processor located within the cover circuitry, wherein the processor is configured to perform operations including:
receiving the input signal; and
transmitting a signal to modify a state of an electrical device.

5. The network device of claim 4, wherein the e of housing electrical contact elements are in physical contact with the set of cover electrical contact elements and form a USB connection.

6. The network device of claim 4, wherein the set of housing electrical contact elements are in physical contact with the set of cover electrical contact elements and form a set of buses, the set of buses including a first bus, a second bus, and a third bus.

7. The network device of claim 1, wherein the cover circuitry includes a sensor located on the room-facing surface of the cover, wherein the sensor is configured to output a sensor reading related to controlling a state of an electrical device.

8. The network device of claim 7, wherein the sensor includes a temperature sensor.

9. A computer-implemented method comprising:
receiving, by a cover circuitry located within a cover, an input signal for controlling a state of an electrical device, wherein a wall-facing surface of the cover is configured to be removably attached to a room-facing side of a housing, and wherein the housing is configured to be mounted into a wall; and
transmitting, by the cover circuitry, a signal to modify the state of the electrical device;
wherein the cover is attachable to the housing;
wherein a set of housing electrical contact elements located on the room-facing side of the housing are electrically coupleable with a set of cover electrical contact elements located on the wall-facing surface of the cover;
wherein the cover circuitry is electrically coupled with the set of cover electrical contact elements;
wherein one or more elements on the room-facing side of the housing are physically accessible through an opening defined by the cover.

10. The computer-implemented method of claim 9, further comprising:
receiving, by the cover circuitry, electric power from a line power, wherein the electric power is received by the cover circuitry from the line power via the set of housing electrical contact elements and the set of cover electrical contact elements.

11. The computer-implemented method of claim 9, wherein the cover circuitry includes an antenna for communicating with the electrical device.

12. The computer-implemented method of claim 9, wherein the set of housing electrical contact elements are in physical contact with the set of cover electrical contact elements and form a USB connection.

13. The computer-implemented method of claim 9, wherein the set of housing electrical contact elements are in physical contact with the set of cover electrical contact elements and form a set of buses, wherein the set of buses include a first bus, a second bus, and a third bus.

14. The computer-implemented method of claim 9, wherein the cover circuitry includes a sensor located on a room-facing surface of the cover, wherein the sensor is configured to output a sensor reading related to controlling the state of the electrical device.

15. The computer-implemented method of claim 14, wherein the sensor includes a temperature sensor.

16. A non-transitory computer-readable medium comprising instructions that, when executed by a processor, cause the processor to perform operations including:
receiving, by a cover circuitry located within a cover, an input signal for controlling a state of an electrical device, wherein a wall-facing surface of the cover is configured to be removably attached to a room-facing side of a housing, and wherein the housing is configured to be mounted into a wall; and
transmitting, by the cover circuitry, a signal to modify the state of the electrical device;
wherein the cover is attachable to the housing;
wherein a set of housing electrical contact elements located on the room-facing side of the housing are electrically coupleable with a set of cover electrical contact elements located on the wall-facing surface of the cover;
wherein the cover circuitry is electrically coupled with the set of cover electrical contact elements;
wherein one or more elements on the room-facing side of the housing are physically accessible through an opening defined by the cover.

17. The non-transitory computer-readable medium of claim 16, wherein the processor is further caused to perform operations including:
receiving, by the cover circuitry, electric power from a line power, wherein the electric power is received by the cover circuitry from the line power via the set of housing electrical contact elements and the set of cover electrical contact elements.

18. The non-transitory computer-readable medium of claim 16, wherein the cover circuitry includes an antenna for communicating with the electrical device.

19. The non-transitory computer-readable medium of claim 18, wherein the set of housing electrical contact elements are in physical contact with the set of cover electrical contact elements and form a USB connection.

20. The non-transitory computer-readable medium of claim 18, wherein the set of housing electrical contact elements are in physical contact with the set of cover electrical contact elements and form a set of buses, wherein the set of buses include a first bus, a second bus, and a third bus.

* * * * *

UNITED STATES PATENT AND TRADEMARK OFFICE
CERTIFICATE OF CORRECTION

PATENT NO. : 9,892,630 B1  
APPLICATION NO. : 15/411537  
DATED : February 13, 2018  
INVENTOR(S) : Raymond Strods Page 1 of 1

It is certified that error appears in the above-identified patent and that said Letters Patent is hereby corrected as shown below:

In the Claims

Claim 1, Column 47, Line 63, please delete "wherein the cover circuitry is electrically coupled with e" and insert --wherein the cover circuitry is electrically coupled with the--

Claim 5, Column 48, Line 17, please delete "The network device of claim 4, wherein the e of" and insert --The network device of claim 4, wherein the set of--

Signed and Sealed this
Twenty-second Day of May, 2018

Andrei Iancu
*Director of the United States Patent and Trademark Office*